(12) United States Patent
Lassau et al.

(10) Patent No.: US 11,531,941 B2
(45) Date of Patent: Dec. 20, 2022

(54) ISSUE RANK MANAGEMENT IN AN ISSUE TRACKING SYSTEM

(71) Applicant: ATLASSIAN PTY LTD, Sydney (AU)

(72) Inventors: Mark Lassau, Sydney (AU); Matt Quail, Sydney (AU); Nikolay Petrov, Austin, TX (US); Ivo Bosticky, Sydney (AU); Michael Elias, Riverdale, NY (US)

(73) Assignee: ATLASSIAN PTY LTD., Sydney (AU)

( * ) Notice: Subject to any disclaimer, the term of this patent is extended or adjusted under 35 U.S.C. 154(b) by 801 days.

(21) Appl. No.: 16/364,084

(22) Filed: Mar. 25, 2019

(65) Prior Publication Data
US 2019/0220799 A1    Jul. 18, 2019

Related U.S. Application Data

(63) Continuation of application No. 14/622,784, filed on Feb. 13, 2015, now Pat. No. 10,282,685.

(51) Int. Cl.
*G06Q 10/00* (2012.01)
*G06Q 10/06* (2012.01)

(52) U.S. Cl.
CPC ........... *G06Q 10/063116* (2013.01); *G06Q 10/06315* (2013.01)

(58) Field of Classification Search
CPC ...... G06Q 10/063116; G06Q 10/06315; G06Q 10/06395; G06Q 10/00; G06Q 10/02; G06Q 10/06; G06Q 10/10; G06Q 30/02; G05B 2219/31357
See application file for complete search history.

(56) References Cited

U.S. PATENT DOCUMENTS

| | | | |
|---|---|---|---|
| 4,525,780 A | 6/1985 | Bratt | |
| 5,274,809 A * | 12/1993 | Iwasaki | G06F 9/526 710/200 |
| 8,719,073 B1 * | 5/2014 | Kirshenbaum | G06Q 30/0201 705/7.14 |
| 2002/0152257 A1 * | 10/2002 | Frolik | H04L 9/40 709/201 |

(Continued)

OTHER PUBLICATIONS

Alipour, Anahita & Hindle, Abram & Stroulia, Eleni. (2013). A contextual approach towards more accurate duplicate bug report detection. 10th Working Conference on Mining Software Repositories (MSR). 183-192. 10.1109/MSR.2013.6624026. (Year: 2013).*

*Primary Examiner* — Joseph M Waesco
*Assistant Examiner* — Jay-Ming Wang
(74) *Attorney, Agent, or Firm* — Brownstein Hyatt Farber Schreck, LLP

(57) ABSTRACT

Described herein is a computer implemented method for maintaining a plurality of issues, each issue having an associated rank value, the rank values of the plurality of issues defining an order of the plurality of issues. The method comprises receiving a rank operation request to change the rank of a subject issue; determining relevant issues to the rank operation request; and attempting to acquire locks on each of the relevant issues. In response to successfully acquiring locks on each of the relevant issues a new rank value for the subject issue is calculated and saved.

19 Claims, 8 Drawing Sheets

(56) References Cited

U.S. PATENT DOCUMENTS

| | | | |
|---|---|---|---|
| 2003/0125044 A1* | 7/2003 | Deloach, Jr. | G01S 19/14 |
| | | | 455/12.1 |
| 2005/0065678 A1* | 3/2005 | Smith | G06Q 10/00 |
| | | | 701/1 |
| 2007/0192306 A1* | 8/2007 | Papakonstantinou | |
| | | | G06F 16/951 |
| | | | 707/999.005 |
| 2009/0254774 A1* | 10/2009 | Chamdani | G06F 9/4881 |
| | | | 707/999.005 |
| 2010/0180057 A1 | 7/2010 | Navarro | |
| 2011/0010720 A1* | 1/2011 | Smith | G06F 9/54 |
| | | | 712/E9.016 |
| 2011/0010770 A1* | 1/2011 | Smith | H04L 9/083 |
| | | | 726/18 |
| 2011/0063093 A1* | 3/2011 | Fung | G06Q 10/0875 |
| | | | 340/10.52 |
| 2013/0198174 A1 | 8/2013 | Poznanski | |
| 2014/0304505 A1* | 10/2014 | Dawson | G06F 21/6227 |
| | | | 713/165 |
| 2015/0347542 A1* | 12/2015 | Sullivan | G06F 16/2455 |
| | | | 707/602 |
| 2016/0239785 A1 | 8/2016 | Lassau et al. | |

* cited by examiner

| 502 | Issue 1. Description. | Assigned to .... | Priority x. | Rank AAA |
|---|---|---|---|---|
| | Issue 2. Description. | Assigned to .... | Priority x. | Rank BBB |
| 504 | Issue 3. Description. | Assigned to .... | Priority x. | Rank CCC |
| | Issue 4. Description. | Assigned to .... | Priority x. | Rank DDD |
| | Issue 5. Description. | Assigned to .... | Priority x. | Rank EEE |

| 502 | Issue 1. Description. | Assigned to .... | Priority x. | Rank AAA |
|---|---|---|---|---|
| | Issue 2. Description. | Assigned to .... | Priority x. | Rank BBB |
| 506 | Issue 3. Description. | Assigned to .... | Priority x. | Rank CCC |
| | Issue 4. Description. | Assigned to .... | Priority x. | Rank DDD |
| | Issue 5. Description. | Assigned to .... | Priority x. | Rank EEE |

| 502 | Issue 1. Description. | Assigned to .... | Priority x. | Rank AAA |
|---|---|---|---|---|
| | Issue 4. Description. | Assigned to .... | Priority x. | Rank AAJ |
| 508 | Issue 2. Description. | Assigned to .... | Priority x. | Rank BBB |
| | Issue 3. Description. | Assigned to .... | Priority x. | Rank CCC |
| | Issue 5. Description. | Assigned to .... | Priority x. | Rank EEE |

Figure 5

ISSUE RANK MANAGEMENT IN AN ISSUE TRACKING SYSTEM

CROSS-REFERENCE TO RELATED APPLICATIONS; BENEFIT CLAIM

This application claims the benefit as a continuation of application Ser. No. 14/622,784, filed Feb. 13, 2015 the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright © 2013-2014 Atlassian Pty Ltd.

FIELD OF THE DISCLOSURE

The present disclosure generally relates to issue tracking systems. The disclosure relates more specifically to techniques for reordering issues in an issue tracking system, techniques for balancing issues in an issue tracking system; and techniques for triggering issue balancing in an issue tracking system.

BACKGROUND

The approaches described in this section are approaches that are known to the inventors and could be pursued. They are not necessarily approaches that have been pursued. Therefore, unless otherwise indicated, it should not be assumed that any of the approaches described in this section qualify as prior art merely by virtue of their inclusion in this section, or that those approaches are known to a person of ordinary skill in the art.

Issue tracking systems are systems that manage the creation and tracking of issues in a variety of contexts. Issue tracking systems are variously referred to a trouble ticket systems, support ticket systems, request management systems, and incident ticket systems.

As one example, an issue tracking system may be deployed for use by a helpdesk. A busy helpdesk may manage thousands, tens of thousands, or even more issues. Each issue may have a different priority, require different actions, be handled by different people, and/or be handled by multiple different people over its lifecycle. An issue tracking system may be used to assist in managing and tracking this process. When a problem is submitted to the helpdesk an issue is created and assigned (at times with a particular priority). As the issue is worked on by various users, the progress of the issue is recorded and tracked by the issue tracking system until, ideally, the issue is solved and closed. At any point during the life of the issue (and/or for historical review purposes) the issue tracking system can be queried to access information on a given issue, such as its status, the actions that have been taken, who the issue is currently assigned to etc.

An important feature of issue tracking systems is the ability for issues to be ranked relative to one another. This allows issues to be prioritized at a granular level. Issue ranking is a complex problem for various reasons, including: (a) the existence of multiple users, all of whom may want to add new issues, assign priorities or re-rank existing issues; (b) automated systems that may also add new issues and/or reorder existing issues; (c) changes to the issues may occur at the same or substantially the same time; (d) multiple actors may attempt to perform different rank operations on the same (or closely ranked) issues; (e) over time issues may become congested in the sense that their rank addresses indicate consecutive ordering without any space for a new issue to be ranked in between.

Some issue tracking systems are implemented in a clustered architecture, typically in order to increase capacity for concurrent users to work with the system and the issues maintained by the system. In a clustered architecture an issue tacking system is implemented across multiple nodes, each node of the cluster running its own instance of the issue tracking system. While end users see and interact with a single issue tracking system, any given operation may, in fact, be performed by any of the system nodes. A clustered architecture increases the complexity of issue ranking. For example, in order to effectively implement a ranking functionality the issue tracking system should be able to handle multiple concurrent modifications of the same issue (and closely ranked issues) by different users on different nodes of the cluster without the rank order of the issues being corrupted.

SUMMARY

The appended claims may serve as a summary of the invention.

BRIEF DESCRIPTION OF THE DRAWINGS

In the drawings:

FIG. 5 is a three part illustration of use of a graphical user interface to reorder an issue;

DETAILED DESCRIPTION

Figure 1:
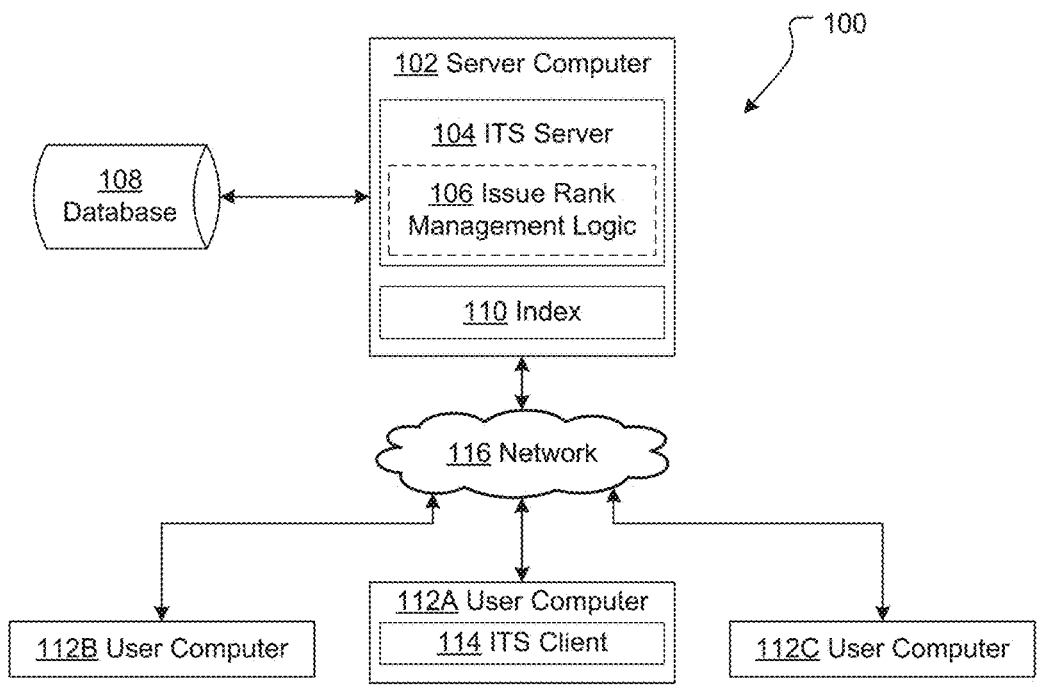
FIG. 1 illustrates a single server architecture issue tracking system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessary obscuring.

This description follows the following outline:
1. Overview
1.1 Single Server Architecture
1.2 Multiple Server Architecture
1.3 General Issue Tracking System Operation
1.4 Issue Ranks
2. Issue Rank Operations
2.1 Operational Context and Problem Domains
2.2 Implementation
2.3 Worked Example
2.4 Issue Rank Operation Embodiments
3. Issue Balancing
3.1 Operational Context and Problem Domains
3.2 Implementation
3.3 Worked Example
3.4 Issue Balancing Embodiments
4. Rebalancing Trigger
4.1 Operational Context and Problem Domains
4.2 Implementation
4.3 Worked Example
4.4 Balancing Triggering Embodiments
5. Implementation Example—Hardware Overview
1. Overview In an embodiment, an issue tracking system provides enhanced mechanisms to manage issues.

As used herein, the term "issue tracking system" (which will be shortened to ITS) generally refers to a system which can be used to track "issues" or, more generally, work items. A work item is an item with associated information and an associated workflow—i.e. a series of states through which the work item transitions over its lifecycle. The workflow for a given work item may be simple (e.g. an open state and a closed state) or more complex (e.g. open, closed, resolved, in progress, reopened). The particular information and workflow associated with an work item may vary greatly depending on the scenario in which the ITS is implemented. By way of example, an ITS may be implemented in a helpdesk scenario, in which case the work items may be issues or tickets logged with the helpdesk. An ITS may be implemented in a project management scenario, in which case the work items may be project tasks. An ITS may be implemented in a software development scenario, in which case work items may be bugs, current features under development, and/or features intended for further development. An ITS may be implemented in an organizational administration scenario, in which case work items may be administrative forms (e.g. leave request forms or the like). Many other ITS implementations in which different work items are tracked through different lifecycles are possible. The embodiments herein will be described in relation to "issues". It will be appreciated, however, that the embodiments and principles thereof may be applied to different types of work items.

One embodiment may be implemented as part of an ITS such as JIRA, which is commercially available from Atlassian Pty Ltd., Sydney, Australia.

An ITS may be provided using a variety of different architectures. One implementation is a client server architecture where the ITS functionality is provided by a server computer and accessed by users from client computers. Two examples of a client server implementation are described generally below. Alternative implementations/architectures are, however, possible. For example, in the case of small enterprises with relatively simple requirements, an ITS may be a stand-alone implementation (i.e. on a single computer directly accessed/used by the end user).

1.1 Single Server Architecture

FIG. 1 illustrates a single server implementation of an ITS 100 in accordance with one embodiment. ITS system 100 comprises a server computer 102. Server computer 102 hosts an ITS server 104 for providing server-side functionality of the ITS. The ITS server 104 comprises one or more application programs, libraries, APIs or other software elements that implement the features and functions that are further described herein. ITS server 104 may include, inter alia, issue rank management logic 106, which configures the ITS server 104 to implement issue rank operations, to initiate issue rank balancing, and/or to implement issue rank balancing as described below.

Server computer 102 also stores or has access to ITS data. ITS data generally includes: ITS metadata defining the operation of the ITS (for example, and as discussed below, issue type definitions, issue workflows, user permissions and the like); and issue data (i.e. data in respect of the issues that have been entered into the ITS and are being maintained by the ITS). ITS data may, for example, be stored on a local file system of the server computer 102, a file system of another computer, and/or managed by a database such as database 108. Database 108 will typically be provided by database server operating on a separate physical computer coupled (directly or indirectly via one or more networks) to ITS server computer 102. Database 108 may however be a database server operating on server computer 102 itself.

In this particular embodiment, server computer 102 stores issue index data 110 locally, and database 108 stores additional issue data and ITS metadata. In alternative embodiments a separate index is not provided with searching being performed on the database 108.

System 100 also comprises a user computer 112. ITS Client computer hosts an ITS client 114 for providing client-side functionality of the ITS 100.

The ITS client 108 may be a general web browser application (such as, for example, Chrome, Safari, Internet Explorer, Opera) which accesses the ITS server 104 via an appropriate uniform resource locator (URL) and communicates with the ITS server 104 via general world-wide-web protocols (e.g. http, https, ftp). The web browser application is configured to request, render and display electronic documents that conform to a markup language such as HTML, XML or extensions, and may be capable of internally executing browser-executable code such as JAVASCRIPT, ACTIVE SERVER PAGES, or other forms of code. Where the ITS client 114 is a web browser, the ITS server 104 will be a web server (such as, for example, Apache, IIS, nginx, GWS). Alternatively, the ITS client 114 may be a specific application programmed to communicate with server 102 using defined application programming interface (API) calls. In this case the ITS server 104 will be a specific application server configured to interact with the ITS client application. A user computer 112 may host more than one ITS client 114 (for example a general web browser client and a specific application client). Similarly, server computer 102 may host more than one ITS server 104.

The ITS server computer 102 may serve multiple user computers 112 (or, more specifically, multiple ITS clients 114). In FIG. 1 three user computers have been depicted (112A, 112B, and 112C), though more or fewer could be used.

The server computer 102 and client computer 112 communicate data between each other either directly or indirectly through one or more communications networks 116.

Communications network 116 may comprise a local area network (LAN) of an enterprise in one embodiment. In this case ITS 100 may be implemented as an on-premises solution in which the server computer 102 and user computer 106 are associated with the same business enterprise and at least the server computer 102 is within an enterprise-controlled facility that is protected from open internetworks using firewalls or other security systems. In another embodiment, network 116 may represent a public internetwork and the server computer 102 may be located off-premises with respect to an organization, such as in a shared data center or cloud computing facility.

1.2 Multiple Server Architecture

Figure 2:
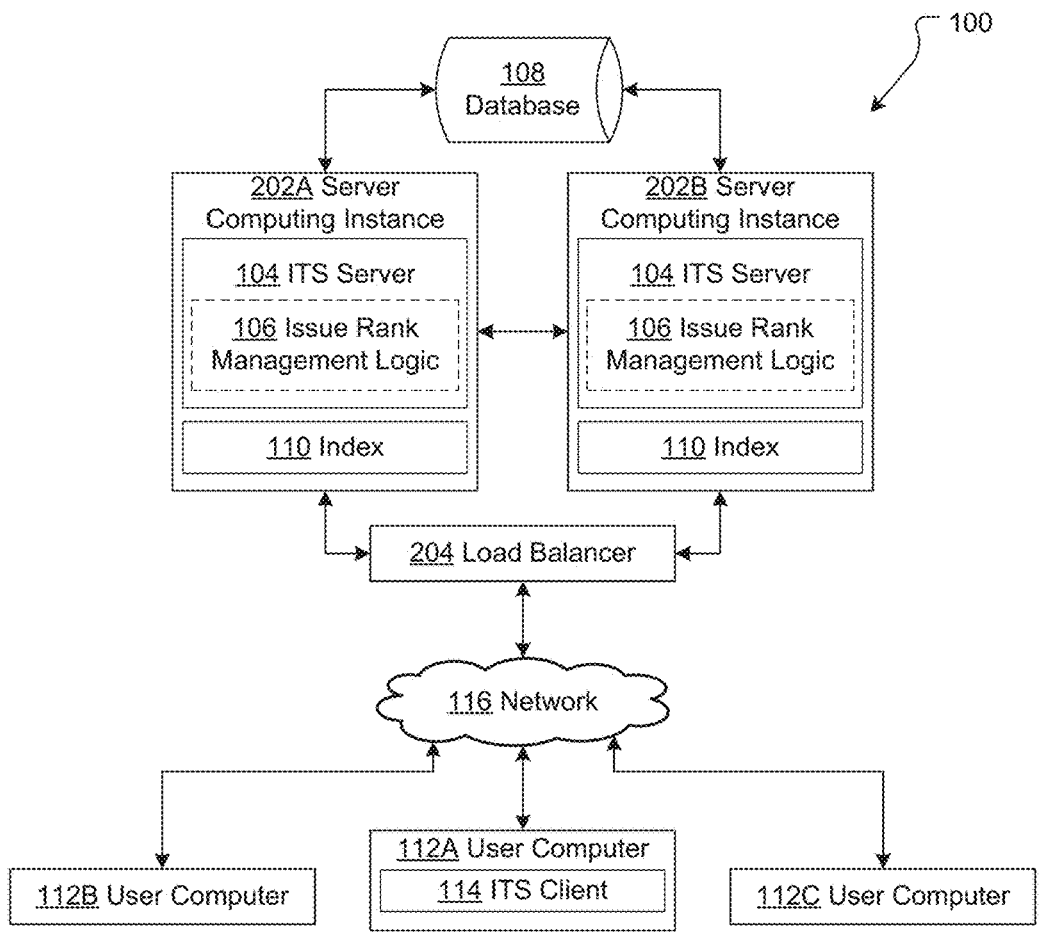
FIG. 2 illustrates a multiple server architecture issue tracking system.

FIG. 2 illustrates a multiple server (clustered) implementation of an ITS in accordance with another embodiment. In the arrangement of FIG. 2, the ITS 100 is implemented using one or more server computing instances 202 (or nodes) that are instantiated on or hosted in a shared data center or cloud computing infrastructure. Examples include AMAZON WEB SERVICES, RACKSPACE, and private cloud data centers. A server computer instance 202 is instantiated on or hosted in a computer, and in some instances a single computer may host several server computer instances 202. In FIG. 2 two server computing instances 202A and 202B have been depicted, but there may be any number of server computing instances instantiated from time to time based upon the number of ITS clients 114 that access the instances, or other performance requirements.

An executable image of each server computing instance 202 includes an ITS server 104 with issue rank management logic 106, in a similar fashion to ITS server 104 described above. Each server computing instance 202 in this embodiment also stores issue index data 110 (also described above), which during operation of the ITS is replicated across all server computing instances. In the arrangement of FIG. 2 all server computing instances access a common database 108 to store and retrieve ITS data.

From the client side, the multiple server ITS 100 arrangement of FIG. 2 is essentially the same as the single server arrangement described with respect to FIG. 1. User computers 112 host ITS clients 114 which facilitate access to the ITS server functionality over network 116. In the arrangement of FIG. 2, however, requests from ITS clients 114 are initially received by a load balancer 204 which distributes requests between the available server computing instances 202. Load balancer 204 may be a hardware or software load balancer.

In the arrangement of FIG. 2, network 116 may represent at least one internetwork, such as the public internet, in combination with one or more wired or wireless LANs, WANs, or other network access infrastructure such as cable modems, routers, etc.

1.3 General Issue Tracking System Operation

This section describes the general manner in which an ITS such as ITS 100 is deployed and used.

ITS 100 maintains ITS metadata defining the operation of the ITS 100. In one embodiment this metadata includes: one or more issue type definitions, each issue type definition defining a field scheme or field configuration for issues of that type (e.g. the possible fields or data to be maintained by the ITS for issues of a given type); one or more workflow definitions, a workflow definition defining the workflow of an issue of a particular issue type (e.g. the states an issue can take and the manner in which an issue transitions between those states over its lifecycle); and user permissions (e.g. which users may create issues, view issues, amend issues, change the states of issues etc.).

ITS 100 may be configured to store a wide variety of information in respect of a given issue. By way of one simple example, an issue type definition may define the following fields: a project field storing a project to which the issue belongs; a key field storing a unique identifier for an issue; a description field storing a description of the issue and actions taken with respect to the issue; a status field indicating the stage the issue is currently at in its lifecycle; an assigned person field indicating who (if anyone) the issue has been assigned to; a severity field storing the severity of the issue (e.g. critical, major, minor, etc.); a priority field storing the priority of the issue at a general level (e.g. very high, high, medium, low, very low); and a rank field storing a rank value in respect of the issue (defining a rank order of the issue relative to other issues). Issue ranking is described in greater detail below. In this example the priority field and the rank field store different information. A large number of issues may have the same priority (e.g. critical), however only one issue may have a given rank value. The actual fields defined with respect to an issue type will depend on the requirements of a given ITS implementation, and many other fields are possible.

Figure 3:
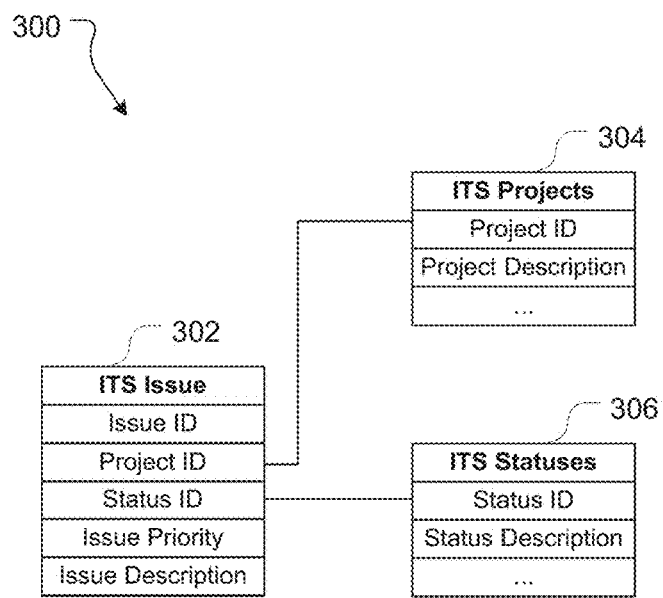
FIG. 3 illustrates one example of a relational database schema.

An ITS may maintain issues in a variety of data structures. In one embodiment issues are stored in a relational database. By way of illustration, FIG. 3 provides a partial example of a simple relational database schema 300 for an ITS. In this example, schema 300 includes: an issue table 302 comprising an issue ID field, a project ID field, a status ID field, an issue description field, and an issue rank field; a projects table 304 comprising a project ID field and a project description field; a status table 306 comprising a status ID field and a status description field. Under this partial schema each issue can only have a single issue rank at a given time. In alternative implementations the schema is defined so a given issue can concurrently have multiple ranks (allowing, for example, different users or user groups to give an issue different ranks).

Schema 300 has been provided for descriptive purposes, however a relational database schema for an ITS will typically be considerably more complex and have additional/different tables with additional/alternative fields and linked in alternative ways. Furthermore, different data structures entirely could, in some cases, be used. For example, issues could be stored in a single table data structure (which may be appropriate for relatively simple ITSs) where the single table stores all relevant issue data. Table 1 provides an example of a simple single table data structure for storing issues:

TABLE 1

| Key | Project ID | Description | Status | Priority | Rank | ... | ... |
|---|---|---|---|---|---|---|---|

Figure 4:
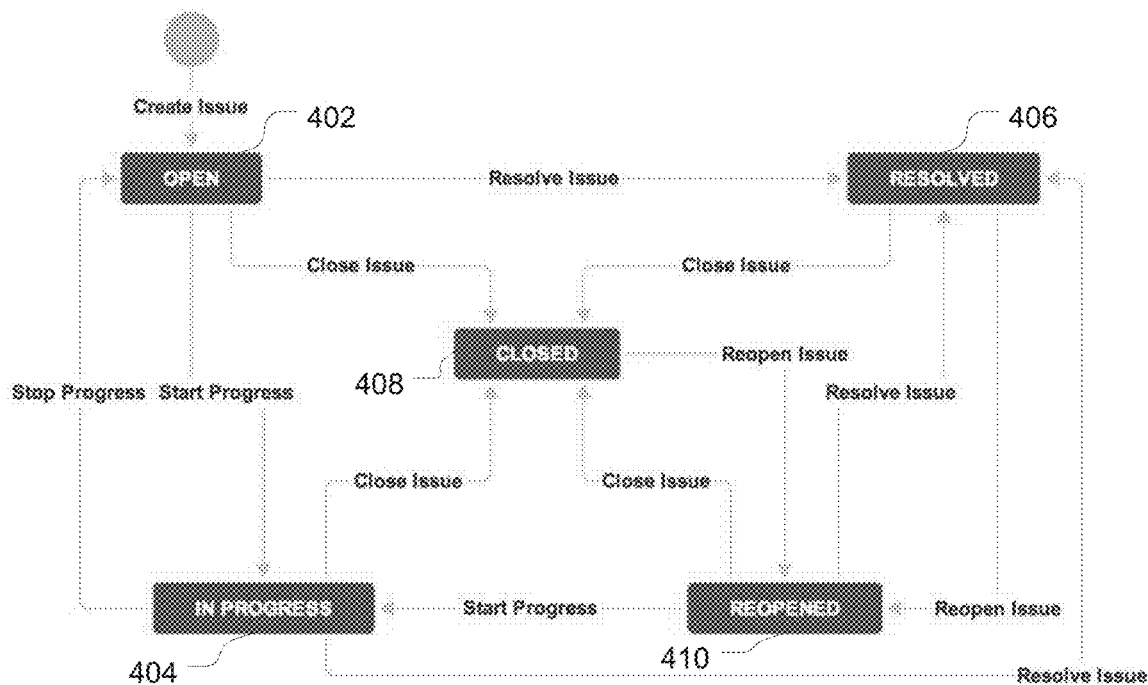
FIG. 4 illustrates one example of an issue lifecycle.

The workflow associated with a given issue will also depend on the specific requirements of the ITS implementation. By way of a simple example, FIG. 4 depicts a lifecycle 400 that could be used in a helpdesk implementation. In lifecycle 400 an issue may take (and transition between): an open state 402; an in progress state 404; a resolved state 406; a closed state 408; and a reopened state 410. Different lifecycles with different states and/or transitions between states will be appropriate for different implementations.

In order to create and progress issues in ITS 100 users interact with appropriate user interfaces provided by an ITS client 114. For example, a user may create a new issue and provide relevant information in respect of the issue (e.g. a particular project the issue is associated with, a description, a priority, any other relevant information catered for). The ITS 100 itself will typically generate a key that can be used to uniquely identify the issue, which may be hidden from or visible to the user. Once an issue has been created a user can interact with it, for example by adding additional information to the issue (e.g. in an issue description or other field), changing the state of the issue (e.g. from in progress to resolved), assigning the issue to another person (e.g. by changing an assigned person field).

1.4 Issue Ranks

As mentioned above, an issue rank value defines the order of an issue with respect to other issues. An issue ranking scheme defines the maximum allowed rank length, what values are available to be assigned to each rank character, and how rank values are ordered. The set of available rank values will be referred to as the rank address space, and is defined by the maximum allowed rank length (i.e. the total number of characters a rank value may include) and the allowed values for each of those characters. The order of the rank values is defined by an ordering system. Actual issue ranks are unique values allowing for the rank order of all issues (or of a subset/collection of the existing issues) to be established. Further, the ITS may be configured so that each issue can be assigned multiple rank values to allow for different ordering schemes. This may be appropriate, for example, where one user or group of users wishes to rank the issues tracked by the ITS differently to another user or group of users.

By way of illustration, issue ranking scheme may define a maximum allowed rank length of four characters, and that the allowed value for each character are is a whole number 0 to 9. This defines that issue rank values are whole numbers from 0000 to 9999 (endpoints inclusive), and gives an address space size of 10,000. In this case an appropriate ordering system could be ascending numerical order—i.e. an issue with a rank value of 0000 being ranked before an issue with a rank value of 0001, an issue with a rank value of 0001 being ranked before an issue with a rank value 0002 and so forth. Numerical Various issue ranking schemes are possible. For example, different issue ranking schemes may be defined by varying the maximum allowed rank length and/or the values a given character may take (e.g. numbers, letters, and/or symbols). Similarly, various ordering systems may be implemented—numerical ordering (which can be applied to numbers and letters—e.g. where hexadecimal is used), lexicographical ordering, or custom defined ordering systems. Applying different ordering systems will impact the ordering of the rank values. For example, in a numerical ordering system a rank value of "6" will rank before a rank value of "20". In a lexicographical ordering system, however, a rank value of "20" will rank before a rank value of "6" (though not before a rank value of "06"). In some instances the maximum rank length may be limited by the maximum field size of the data structure being used to store issues—for example some databases may impose a 255 byte (character) limit to an index field. In this case characters that are not necessary for the rank value may be dealt with trailing null characters or explicit leading zeroes. For example, a rank value of "AB" in a 6 character fixed width field could be stored as "ABØØØØ" (or "ØØØØAB") or "0000AB".

In one particular embodiment, an issue ranking scheme defines a maximum allowed rank length of 253 characters, and that each of the 253 characters is capable of being an alphanumeric character—i.e. any of 0 to 9 or A to Z. In this case each character may take any one of 36 values, providing a rank address space with 36 to the power of 253 unique ranks (and therefore capable of definitively ordering 36 to the power of 253 issues). In this embodiment a lexicographical ordering system is used to determine the order of the ranks. A lexicographical ordering scheme may be advantageous where the ITS 100 allows for full text indexing and searching of issue data (for example by using Apache Lucene), as in this case alphanumeric issue ranks can be treated as any other text field.

In certain embodiments the rank length of a particular issue's rank value is relevant. In one embodiment issue ranks are stored in a variable character (varchar) field. In this case an issue's rank length is simply the number of characters in the issue rank. For example a rank value of "AA" has a rank length of two, a rank value of "AAAAAAAA" has a rank length of eight.

In other embodiments issue ranks may be stored in a fixed size field. In this case each issue will have the number of characters defined by the size of the fixed size field (which also defines the maximum allowed rank length), irrespective of how many of the characters are actually needed. In this case characters not needed to define the rank may be assigned a special value (e.g. a null character, indicated herein as Ø). In this case the length of an issue rank value is the number of "normal" (e.g. non-special characters) in the rank value. This can be calculated in a variety of ways. For example, if trailing special characters are used the length of a rank value can be determined with reference to the index position of the last non-special character. E.g., in "ABØØØØ" the index position of the last non-special character ("B") is 2 (the index starting from 1), and the length of the rank value is 2. Alternatively, in "ABBCØØ" the index position of the last non-special character ("C") is 4 and the length of the rank value is 4. If leading special characters are used the index position of the last non-special character can again be used to calculate the length of a rank value, though in this case with reference to the size of the field. E.g., in "ØØØØAB" the index position of the first non-special character ("A") is 4 (the index in this case starting from 0), and the length of the rank value is the size of the field (6) take this index position: 6−4=2. Alternatively, in "ØØABBC" the index position of the first non-special character is 2 and the length of the rank value is (6−2)=4.

In alternative embodiments, instead of using special symbols such as null characters, rank values may be "packed" with leading characters that take the lowest possible character value. By way of example, if a ranking scheme defines that characters may take the values A-Z (and a lexicographical ordering system is used), the character 'A' is the lowest possible character value. Alternatively, if a ranking scheme defines that characters may take the values 0-9 (and an ascending numerical ordering system is used), the character '0' is the lowest possible character value. In this case, a field of 6 characters storing a rank of "102" would be stored as "000102" and a rank of "50" would be stored as "000050". In this case an issue's rank length is determined with reference to the index of the first character that takes a value other than the lowest possible character value defined by the ranking scheme. For example, rank length may be calculated by subtracting the index of the first character taking a value other than the lowest possible character value from the size of the fixed length field (the index of a character being counted from zero). Presuming the lowest value a character can take is '0', in a six character fixed size field a rank value of "000105" has a rank length of three (the numeral 1 being the first character taking a non-zero value and being in index position 3); a rank value of "000009" has rank length of one (the numeral 9 being in index position 5); a rank value of "010012" has a rank length of five (the first 1 in the value being in index position 1); a rank value of "310012" has a rank length of five (the number 3 being in index position 0).

Various ranking schemes are used for descriptive purposes herein. These ranking schemes have been selected in order to illustrate relevant features. It will be appreciated, however, that the features described can be applied to alternative ranking schemes with alternative (and typically significantly larger) maximum allowed rank lengths, different allowed character values, and/or different ordering systems.

When an issue is created in the ITS 100 it is assigned a rank value. Over the lifecycle of an issue its rank may be changed many times—either in response to a user reordering request (e.g. to increase or decrease the importance of an issue relative to other issues), or as a result of the ITS server 104 performing rank management operations (e.g. balancing issue ranks as described below). A rank operation may be initiated by a user request, for example where the user requests that an issue be reordered. In this case a user may change the issue rank value manually, for example by accessing the rank field of the issue and entering a desired value.

Alternatively, a user initiated rank operation may be the result of a user interacting with a graphical user interface provided on a user computer 112 by the ITS client 114. An example of such a user interface is depicted in FIG. 5. The user interface graphically depicts five issues, respectively identified by the numbers 1 to 5—on a display screen 502 of the user computer 112. In this example numbers 1 to 5 are simply issue identifiers (e.g. an issue name or key or the like) and do not indicate the rank of the issue which is defined by an issue rank field. Each issue is displayed with additional information—in this case, and by way of example only, a description of the issue, an assignee of the issue, and the priority of the issue. Although the rank values of the issues are depicted in FIG. 5, this need not be the case—and often actual rank values will not be displayed (particularly where they are large values that are not particularly readable to a user). The issues are displayed so that a user can tell their order intuitively without reference to the specific rank value—in this case the issues are displayed in rank order from top to bottom—i.e. in screen 504 Issue 1 is above and ranked before Issue 2, Issue 2 is above and ranked before Issue 3 etc. During interaction with the ITS 100 a user may wish to reorder an issue. For example a user may wish to rank Issue 4 between Issue 1 and Issue 2. To do so the user manipulates Issue 4, for example by dragging and dropping Issue 4 into the desired order (e.g. by interaction with a touch screen display, by use of a mouse or other pointing device, or by keyboard commands). Screen 506 depicts a point in time in the user interface where the user has selected Issue 4 and started moving it, and screen 508 shows the completed operation. In screen 508 the user can now visually see that Issue 4 has been ranked after Issue 1 and before Issue 2. In the background, and as described in further detail below, the ITS server has performed a rank operation to adjust the rank of at least Issue 4 in order to reflect the changed order of the issues. In this particular case Issue 4 has been given a rank value of AAJ, which sits between the rank value of Issue 1 ("AAA") and the rank value of Issue 2 ("BBB").

This specification will describe two general types of rank operations in which the rank value of an issue is (or may be) changed: reordering rank operations and balancing rank operations.

In a reordering rank operation a request is made to change the order of an issue so that it ranks after an issue it is currently ranked before, or so that it ranks before an issue it is currently ranked after. A successful reordering rank operation will change the order of the issues relative to one another.

In a balancing operation the rank value of an issue is changed, but its order relative to other issues remains the same. After a rebalancing operation the issue is ranked before all issues it was ranked before prior to the rebalancing operation and is ranked after all issues it was ranked after prior to the rebalancing operation.

2. Issue Rank Operations 2.1 Operational Context and Problem Domains

In various embodiments, the techniques herein address several problems that the inventors have identified in the conventional operation of ITSs. As one example, while allowing multiple users (via multiple ITS clients 114) to interact with the ITS at the same time is desirable, doing so can cause unintended consequences, particularly where multiple rank operations are performed on issues with the same or close rank values at the same (or approximate same) time.

For example, a current state of the ITS 100 may include four issues as shown in Table 2 (presuming a maximum allowed rank length of three alphanumeric characters and a lexicographical ordering scheme). Note that while numeric values have been used as issue identifiers these are merely identifiers and do not indicate any order of the issues (which is defined by the issue rank field).

TABLE 2

| Issue identifier | Issue Rank |
|---|---|
| 1 | AAA |
| 2 | BBB |
| 3 | CCC |
| 4 | DDD |

One user submits a first request to reorder issue 1 immediately before issue 4. At around the same time another user (via another ITS client 114) submits a second request to reorder issue 4 immediately after issue 1.

The ITS server 104 receives the first request and launches a first thread to perform the requested operation. The first thread reads the rank values of issue 4 ("DDD") and the issue ranked before issue 4 (issue 3, "CCC").

The ITS server 104 then receives the second request and launches a second thread to perform the requested operation. The first thread is interrupted and the second thread performs its rank operation. The second thread reads the rank values of issue 1 ("AAA") and the issue that is ranked after it (issue 2, "BBB"). Based on these rank values thread 2 determines a new rank value for issue 4—e.g. "ABC" (being a rank value between "AAA" and "BBB") and writes the new rank value. Following this operation the state of the ITS is as shown in Table 3:

TABLE 3

| Issue identifier | Issue Rank |
| --- | --- |
| 1 | AAA |
| 4 | ABC |
| 2 | BBB |
| 3 | CCC |

With the second thread finished, the first thread resumes where it left off. Recall that the first thread has read the rank values of issues 4 and 3 as "DDD" and "CCC" respectively, despite the fact that the rank value of issue 4 has subsequently been altered by the second thread. Based on these rank values the first thread determines a new rank value for issue 1: "CCD" (being a rank value between "CCC" and "DDD"). Following this operation the state of the ITS is as shown in Table 4:

TABLE 4

| Issue identifier | Issue Rank |
| --- | --- |
| 4 | ABC |
| 2 | BBB |
| 3 | CCC |
| 1 | CCD |

As can be seen, the actual order at the end of the two user requests is: issue 4, issue 2, issue 3, issue 1. The two requests have interfered with each other and as a consequence neither user request has been satisfied: issue 1 is not ranked before issue 4 as requested by the first user, and issue 4 is not ranked after issue 1 as requested by the second user.

As this example illustrates, there is a need for techniques that improve the ability to reorder issues in an ITS to prevent, or at least reduce, unintended consequences. This is particularly the case in a clustered architecture as described above, where multiple ITS servers 104 may be independently receiving and processing reordering operations in respect of the same issues from multiple ITS clients 114.

2.2 Implementation

In one embodiment, in order to facilitate ranking operations a lock mechanism is implemented. The lock mechanism prevents rank operations from manipulating rank values of issues that are relevant to other rank operations. In this context a rank operation is an operation that involves the alteration of an issue rank. A rank operation may involve reordering of issues relative to one another (e.g. by the rank of an issue being changed so the issue ranks before or after another issue), but need not. For example in the in the balancing of issues described below the rank of an issue is changed without impacting its order relative to other issues. A rank operation may be initiated on receiving a user request to change the order of an issue, or may be automatically initiated by an ITS server 104 itself.

Given the various architectures that the ITS may be deployed in, the lock mechanism described herein is designed to work in a single server or clustered (multi-server) environment. In a clustered environment the database 108 provides a synchronization point. Some databases provide native functionality for locking records/preventing conflicting operations. Even if such native functionality could be invoked to provide a viable solution to the problem described above, a problem still exists if the ITS 100 is deployed for use with a different database having different native functionalities. Even if one type of database does have useful native functionality, another database that the ITS 100 is to be used with may not (or may, but implement it in a different way). Accordingly, the techniques described herein are database agnostic, in that they do not rely on any particular native database locking/conflict management functionality.

In order to avoid the issue reordering problems described above, one embodiment involves the creation of lock information fields for storing lock information associated with an issue. Where a rank operation is to be performed (for example by reordering an issue) the operation will attempt to acquire a lock. If the lock cannot be acquired (due to another operation having acquired a lock) the rank operation will not be able to proceed.

In one embodiment the lock information fields include a lock value field and a lock time field. The lock information fields may be associated with an issue in any appropriate manner. For example, and continuing with the simple database schema 300 described above, the lock information fields may be defined in the table storing issue rank information (ITS Rank table 312 in this case). An example table structure is depicted in Table 5. The lock information fields could be stored in other tables and/or related to a particular issue in alternative ways.

TABLE 5

| Issue_ID | Rank_Value | Lock_Value | Lock_Time |
| --- | --- | --- | --- |
|  |  |  |  |

The lock value field stores a value indicating when the issue (as identified by the issue ID) is locked. This occurs when a rank operation is in progress. The lock time field stores a time value allowing the time since the lock was acquired to be determined and/or the time at which the lock placed on the issue expires in the event the lock is not released by the thread or process that initially locked it.

Figure 6:
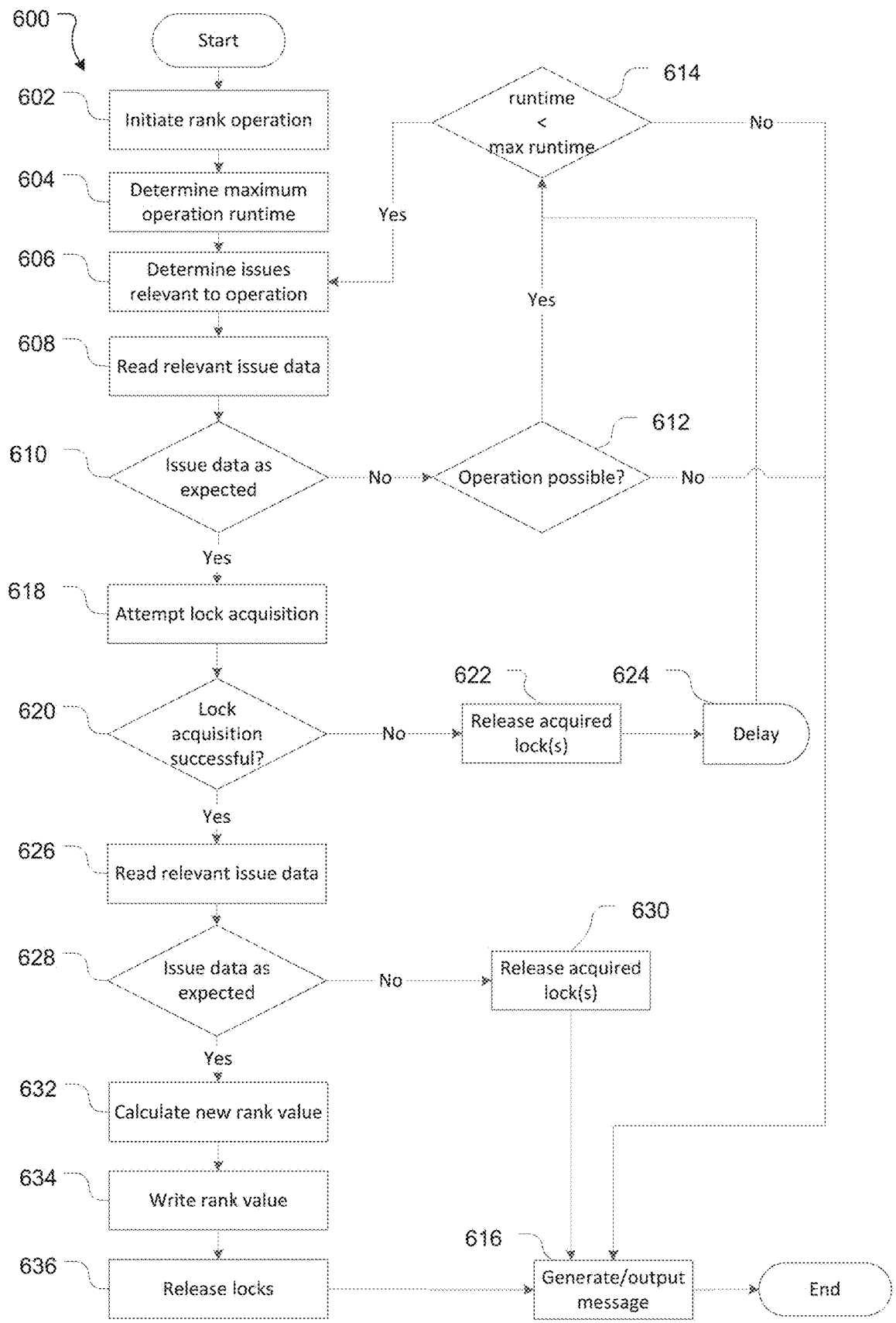
FIG. 6 illustrates a process of performing a rank operation.

FIG. 6 illustrates a process 600 of performing a rank operation.

At 602 a rank operation is initiated by the ITS server 104. A rank operation may be initiated on receiving a request from a user to change the rank of an issue, or may by initiated by an ITS server 104 itself.

At 604 a maximum operation runtime for the rank operation is determined. The maximum operation runtime value defines the maximum allowed runtime for the rank operation, and is checked (at 614) any time the rank operation cannot proceed. By way of one example, a suitable maximum operation runtime may be set as 5 seconds.

At 606 the process determines the relevant issues to the rank operation. The relevant issues to the rank operation depend on the type of rank operation being performed. In one embodiment, the types of rank operations include reordering rank operations, a rank deletion operation, and rebalancing operations. A reordering operation arises from a request to change the order of the issues—for example to rank an issue first, to rank an issue immediately before another issue, to rank an issue immediately after another issue, to rank an issue last. A rank deletion operation arises from a request to delete an issue and its rank. A balancing operation arises from a request to balance an issue by changing the rank value without changing the order of the issues (issue balancing is discussed in detail in Section 3 below).

In order to facilitate certain rank operations, minimum and maximum marker records can be created in the data structure. The minimum marker record stores a minimum (i.e. first) rank value that can be used (e.g. 000). The maximum marker record stores a maximum (i.e. last) rank value that can be used (e.g. ZZZ). In one embodiment the minimum and maximum marker records are stored as "dummy" issues, for example issues 5 and 6 shown in table 6. In the example shown in table 6 the minimum and maximum marker records are given issue identifiers of −1 and −2 respectively to distinguish them from "normal" issues (with IDs of >=zero) and protect them from unintended ranking operations. In addition, or alternative, protection of the minimum and maximum markers may be achieved by an "issue type" field—for example type 1=normal issue, type 2=minimum marker issue, type 3=maximum marker issue.

TABLE 6

| Issue_ID | Issue_Rank | Lock_Value | Lock_Time |
|---|---|---|---|
| −1 | 000 | | |
| −2 | ZZZ | | |

In one embodiment, different reordering rank operations include: a rank first operation; a rank last operation; a rank before operation; and a rank after operation. Alternative reordering rank operations are possible. The relevant issues for a reordering rank operation are the subject issue (i.e. the issue whose order and rank value is actually being changed), and the two issues which the subject issue is intended to be ordered between in order to complete the reordering operation. The two issues which the subject issue is intended to be ordered between will be referred to as neighbor issues, and specifically a lower ranked neighbor (i.e. the neighbor issue with the lower rank value to the subject issue) and a higher ranked neighbor (i.e. the neighbor issue with the higher rank value to the subject issue). In some cases a determination may be made that the subject issue is one of its own neighbors. For example, an issue will be its own higher ranked neighbor if a request is made to rank an issue after a particular issue and the issue is already the next highest ranked issue to the particular issue. Similarly, an issue will be its own lower ranked neighbor if a request is made to rank a subject issue before a particular issue and the subject issue is already ordered immediately before the particular issue (i.e. has the next lowest rank to the particular issue). In this case the process determines that the subject issue is already in the correct order.

The rank first operation is performed when a reorder request is made to rank a subject issue first. The rank first operation ranks an issue before all existing real issues (i.e. before all issues except the minimum marker issue) maintained by the ITS 100. The relevant issues for a rank first operation, therefore, are the subject issue, the minimum marker issue (being the lower ranked neighbor) and the issue currently ranked first (being the higher ranked neighbor). Ranking an issue first may, for example, be achieved by subtracting a constant number from the rank value of the first real issue (provided this yields a rank in the rank address space). As an alternative example, ranking an issue first may involve calculating and assigning the rank halfway (or approximately half way) between the rank of the first actual issue and the minimum marker row.

The rank last operation is performed when a reorder request is made to rank a subject issue last. The rank last operation ranks an issue after all the existing real issues (i.e. after all issues except the maximum marker issue) maintained by the ITS 100. The relevant issues for a rank last operation, therefore, are the subject issue, the maximum marker issue (being the higher ranked neighbor) and the issue currently ranked last (being the lower ranked neighbor). Ranking an issue last may, for example, be achieved by adding a constant number from the rank value of the last real issue (provided this yields a rank in the rank address space). As an alternative example, ranking an issue last may involve calculating and assigning the rank halfway (or approximately half way) between the rank of the last actual issue and the maximum marker row.

When a new issue is created without a specific rank/order being specified the rank last operation may be invoked in order to provide the issue with an initial rank value and position in the order. If a new issue is the very first issue created and added to the ITS it may be ranked halfway between the ranks of the minimum and maximum makers.

The rank before operation is performed when a reorder request is made to rank a subject issue before a specified issue. The rank before operation ranks the subject issue immediately before the specified issue (i.e. between the specified issue and issue with the next lowest rank value). The relevant issues for a rank before operation, therefore, are the subject issue, the specified issue (being the higher ranked neighbor), and the issue with the next lowest rank value to the specified issue (being the lower ranked neighbor). If the specified issue is the lowest ranked real issue (i.e. the lowest tanked issue excepting the minimum marker issue), the issue with the next lowest rank will be the minimum marker issue.

The rank after operation is performed when a reorder request is made to rank a subject issue after a specified issue. The rank after operation ranks the subject issue immediately after the specified issue (i.e. between the specified issue and issue with the next highest rank value). The relevant issues for a rank after operation, therefore, are the subject issue, the specified issue (being the lower ranked neighbor), and the issue with the next highest rank value to the specified issue (being the higher ranked neighbor). If the specified issue is the highest ranked real issue (i.e. the highest tanked issue excepting the maximum marker issue), the issue with the next highest rank will be the maximum marker issue.

The delete rank operation is performed when an issue is to be deleted (in which case its rank value is also deleted). In a delete rank operation there is no need to determine higher/lower ranked neighbor issues—the only relevant issue being the subject issue actually being deleted.

Balancing issues is described in more detail in Section 3 below. In one embodiment balancing rank operations include: a start balance up operation, a start balance down operation, a balance issue up operation, and a balance issue down operation.

A start balance up rank operation is performed to commence a balance up process. The relevant issue for a start balance up operation is the maximum marker.

A start balance down rank operation is performed to commence a balance down process. The relevant issue for a start balance down operation is the minimum marker.

A balance issue up rank operation is performed to balance issues during a balance up process. The relevant issues for a balance issue up rank operation are the subject issue being balanced up and a higher ranked neighbor.

A balance issue down rank operation is performed to balance issues during a balance down process. The relevant issues for a balance issue down rank operation are the subject issue being balanced down and a lower ranked neighbor.

Returning now to FIG. 6, at 608 the process reads data in respect of the relevant issues identified at 606. The data read includes, for each relevant issue, the issue ID, the issue rank value, and the lock value (if any).

At 610 the process determines whether the data in respect of the relevant issues is as expected. The expected data is dependent on the nature of the rank operation being performed. For example, for a reordering operation it will be expected that: the subject issue is not the same issue as either of the neighbor issues; that there is at least one available rank between the ranks of the neighbors (i.e. that there is space for the issue to be ranked in the desired order); and that none of the relevant issues is locked with a current lock (i.e. a lock that has not expired). Expected issue data for balancing rank operations is described in section 3 below.

At 612, in response to the relevant issue data not being as expected, the process determines if the requested rank operation should be possible. By way of example, a reordering rank operation will not be possible if the process determines that the issues are already in the requested order. This will be the case if the subject issue ID is the same as the issue ID of either of the determined neighbor issues. A reordering rank operation will also not be possible if there is no rank value available that will result in the issues being ordered as requested. This will be the case if the determined neighbor issues hold immediately adjacent rank values (i.e. without any intervening rank values) in the issue rank scheme.

At 614, in response to determining that the operation should be possible, the process determines whether the actual runtime of the operation is less than the maximum operation runtime determined at 604. In response to determining that the actual runtime is less than the maximum operation runtime, the operation returns to 606 and reattempts performance of the rank operation.

At 616, in response to determining that the actual runtime is greater than or equal to the maximum operation runtime, an output message is generated and returned to the user or process that initiated the rank operation. The output message may return information on the error—i.e. that the maximum runtime was exceeded. The rank operation then ends.

An output message is also generated and returned at 616 in response to determining that the rank operation is not possible (at 612). The output message may simply indicate an error, or may define the nature of the error (e.g. issues in correct order, ranks too congested). In one embodiment, if a rank operation is not possible due to there being no available rank value that will result in the issues being ordered as requested, a balancing process is commenced without delay—for example as described in Section 3 below.

At 618, in response to determining that the relevant issue data is as expected at 610, the process attempts to acquire locks on each of the issues identified as being relevant to the rank operation. In one embodiment, attempting to acquire a lock on an issue involves determining whether the lock value of the issue indicates the issue to be locked or unlocked. If the lock value for a given issue does not indicate the issue is locked, the process generates a lock value and writes this to the issue. Conversely, if the lock value indicates the issue is locked then the process cannot acquire a lock on that issue. An issue may be found to be locked at 618 if, for example, between checking the relevant issue data at 610 and attempting to acquire a lock at 618 another process has acquired locks on one or more of the relevant issues.

In one embodiment, the lock value field may simply store a flag—e.g. a value of 1 indicating the issue is locked, and a value of 0 (or NULL) indicating the issue is not locked.

In another embodiment, the lock value that indicates an issue is locked is an identifier, such as a unique identifier or a universally unique identifier (UUID). A unique identifier or UUID may be randomly generated by the ITS server 104 as required. Using a UUID or similar has the advantage that in the event that a lock cannot be acquired on all relevant issues, any locks that are acquired can be easily rolled back. For example, if the three relevant issues with issue identifiers 42, 47, and 49 have been identified and the UUID of qw347 has been generated, SQL statement 1 below may be used to try and acquire locks on the relevant issues in a single lock acquisition request:

| SQL Statement 1 |
| --- |
| UPDATE ITS_TABLE<br>SET LOCK_VALUE = 'qw347'<br>WHERE ISSUE_ID IN (42, 47, 49)<br>AND LOCK_VALUE IS NULL |

In one embodiment, when a lock is acquired on an issue a lock time value is written to the lock time field. The lock time value is used to ensure that an issue does not remain locked indefinitely (or for an undue length of time), which could impact on the completion of other rank operations. This may be achieved in a number of ways. For example, the lock time value may be a timeout period which decays and, on reaching zero, the lock is released. Alternatively, the lock time value may be set to be a specific time that is a defined time period after a current system time, and when that time is reached the lock is released. The maximum period of time for which a lock can be maintained can be set as desired. By way of example a period of 30 seconds may be appropriate.

At 620 the process determines whether the lock acquisition operation was successful. In order to be successful, locks must have been acquired on all relevant issues, for example by writing new lock values to those issues. The lock acquisition will not be successful if any relevant issues were not successfully locked. Where the lock acquisition attempt is made by SQL statement 1 above (or a similar statement), the SQL statement returns a count of the number of rows that are updated. If the returned count is less than the number of relevant issues to the rank operation, the lock acquisition has not been successful. Conversely, if the returned count is equal to the number of relevant issues the lock acquisition has been successful. For example, reordering operations have three relevant issues (the subject issue and two neighbors). As such a returned count of three indicates all required locks have been successfully acquired, and the lock acquisition operation is successful. A return count of less than three indicates that at least one required lock was not been acquired and the lock acquisition operation is not successful.

At 622, in response to determining that the lock acquisition (on all relevant issues) was not successful, the process releases any locks that were acquired. For example, if the returned count for a reordering operation was 2 it would indicate that two of the relevant issues were locked, but one was not. The return value of 2 does not, however, provide information on which lock(s) weren't acquired. A consequence of this is that the operation cannot proceed (as not all relevant issues have been locked), but that it has locked two issues which could impeded other rank operations.

If a simple flag value was used as the lock value (e.g. 1=locked, 0/NULL=unlocked) it would not be possible to determine which issues had been locked as a consequence of a single lock acquisition request such as the SQL statement 1 above, and which issues had been locked by another rank operation. By using an identifier as the lock value, however, determining which issues have been locked by the instant rank operation (and releasing those issues) is simple. For example, SQL statement 2 below could be used to release all relevant locks—those with the relevant lock value identifier—in a single lock release request:

```
SQL Statement 2

UPDATE ITS_TABLE
SET LOCK_VALUE = NULL
WHERE LOCK_VALUE = 'qw347'
```

In an alternative embodiment, attempting to acquire locks on the relevant issues involves initiating a separate lock acquisition operation for each relevant issue. In this case each individual lock operation is recorded as being successful or unsuccessful, and if any of the lock operations fail locks that were acquired can be rolled back/unlocked. In some cases, however, using separate operations to acquire the required locks is less efficient than doing so in a single operation. Furthermore, using separate operations increases the likelihood that between the successive lock operations locks on desired records will be acquired by other processes, and therefore the likelihood that the rank operation will not be able to proceed.

After releasing any acquired locks at 622, the process implements a delay at 624. The delay is to allow other operations to complete and, if necessary, issues locked by other processes to be unlocked before trying to perform the rank operation again. In one embodiment the period delayed at 624 is calculated based on how many times the rank operation has been forced to delay. The first time a rank operation is forced to delay the delay is introduced by performing a no-op instruction. The second time the same rank operation is forced to delay an instruction is executed to allow for other threads/processes to complete (for example by calling Thread.yield in a JVM implementation). The third (and any subsequent) time the same rank operation is forced to delay the thread controlling the rank operation is put to sleep for a calculated period of time. In one embodiment the sleep period is calculated to be (in milliseconds): (numberOfDelays*50)+random(numberOfDelays*50). A random element is introduced to prevent rank operations backing off in lockstep with each other. Alternative delay mechanisms could be used—for example by defining a static delay period or implementing an alternative delay algorithm (such as an exponential back-off algorithm).

Following the delay at 624 the process returns to 616 to check the current runtime has not exceeded the maximum allowable runtime.

At 626, in response to determining the lock acquisition operation is successful, the process re-reads the data in respect of the relevant issues.

At 628, the process re-determines whether the data in respect of the relevant issues is as expected. This is to protect against any variation that may have occurred between the check at 610 and the lock acquisition at 620. Any variation between the data read at 608 and the data read at 626 will indicate that the data is not as expected. This check is performed to determine whether any other user/process reordered relevant issues prior to acquiring an exclusive lock on those issues.

In response to determining that the data is not as expected at 628, the process at 630 releases locks that were successfully acquired (at 620) and aborts. In this case a "concurrent modification error" or similar message may be generated at 616.

At 632, in response to determining that the data is as expected, the process calculates the new rank value for the issue. The calculation of new rank values is described further below.

At 634, the new rank value is associated with the subject issue—for example by being written to the rank value field of the row associated with the issue ID of the subject issue.

At 636 the process releases the acquired locks, for example by using a statement such as SQL Statement 2 above. The process also clears (sets to NULL) the lock time values of the relevant issues.

Following the release of the acquired locks the process generates an output message at 616 indicating the rank operation has been successful and ends.

Performing rank operations by the process described above prevents multiple rank operations from interfering with one another. This is achieved without requiring the entire database (or rank table) to be locked, and as such multiple non-colliding rank operations can be performed at the same (or substantially the same) time. Non-colliding rank operations in this sense are rank operations that do not involve the same relevant issues. Furthermore, the process provides cluster-safe locking without requiring extra configuration or node-discovery, and is immune to network partitions as it does not require network connectivity between ITS server nodes.

Calculation of New Rank Values: Reordering Rank Operations

A variety of techniques may be used to calculate the new rank value in a reordering operation. The particular calculation/technique used may depend on the type of rank operation being performed.

For reordering rank operations a new rank value is calculated by determining a new rank value falling between the rank value of the lower ranked neighbor and the rank value of the higher ranked neighbor. In one embodiment a new rank value is calculated by: reading the rank values of the higher and lower ranked neighbors; converting these rank values to numeric rank values (if necessary); calculating a new numeric rank value as: floor((numeric rank of lower ranked neighbor+numeric rank value of higher ranked neighbor)/2)) [the ceiling could alternatively be used]; and converting the new numeric rank value back to an actual rank value (if necessary). Conversion to numeric rank values may be necessary where a rank value includes symbols or letters. Determining the new rank value to be the rounded midpoint between the rank values of the neighbor ranks results in the new rank value having the maximum distance from both neighbors (distance in this sense referring to the number of rank values between two given rank values).

Figure 7:
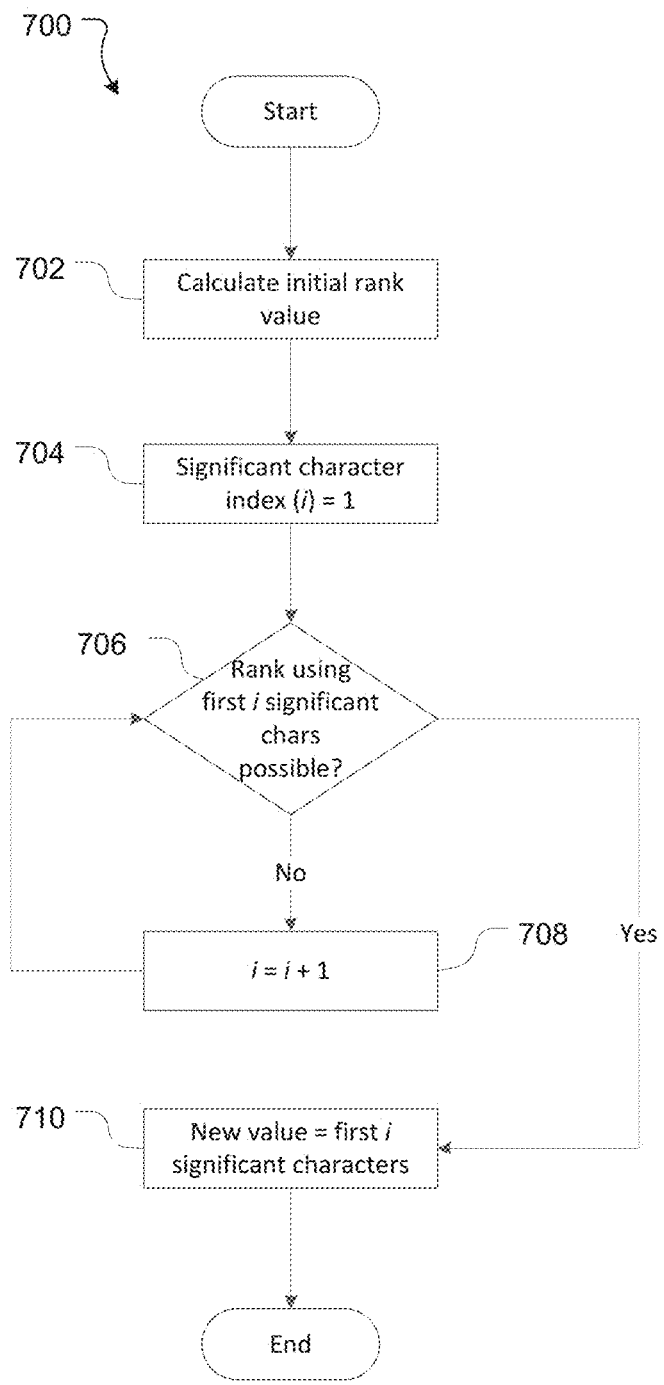
FIG. 7 illustrates a process of calculating a new rank value of reduced length.

In one embodiment, new rank values are calculated with a view to reducing the length of the new rank values. This is generally achieved by calculating new rank values to pack out the higher significance characters before resorting to characters of lower significance. FIG. 7 illustrates an example process 700 for minimizing or reducing the length of a new rank value.

At 702 the process calculates an initial rank value for subject issue. In this embodiment this calculation is: floor ((numeric rank of lower ranked neighbor+numeric rank value of higher ranked neighbor)/2)).

At 704 the process initializes a significant character index i to one (i=1).

At 706 the process determines whether ranking the subject issue using only the first i significant characters of the initial rank value calculated at 702 is possible. This involves comparing the initially calculated rank value truncated to the first i significant characters to the rank values of the upper and lower neighbors. If the truncated initial rank value falls between the higher and lower ranked neighbors (i.e. is greater than the lower ranked neighbor and less than the higher ranked neighbor), then this truncated rank value is viable and ranking using the first i significant characters of the initial rank value calculated at 702 is possible. If not (i.e. the truncated initial rank value is less than or equal to the rank value of the lower ranked neighbor or is greater than or equal to the rank value of the higher ranked neighbor), ranking using the first i significant characters of the initial rank value calculated at 702 is not possible.

At 708, in response to determining that ranking the subject issue using only the first i significant character is not possible, the significant character index is incremented (i=i+1). The process then returns to 706.

At 710, in response to determining that ranking the subject issue using only the first i significant characters is possible, the new rank value is set to be the first i significant characters of the initial rank value calculated at 702.

To illustrate process 700, consider an issue ranking scheme with a maximum rank length of three and allowed characters of 0 to 9. For this scheme a minimum marker is set at rank "000" and a maximum marker is set at rank "999". When the first issue is added to the ITS a rank last operation is performed—in which case the subject issue is the new issue itself, the higher ranked neighbor is the maximum marker (rank value "999") and the lower ranked neighbor is the minimum marker (rank value "000"). At 702 the initial rank value for the new issue is calculated to be: floor((000+999)/2))=499. At 704 the significant character index is set to i=1, and at 706 a determination is made as to whether or not ranking using only the first significant character of the initial rank value is possible. In this case the first significant character of the initial rank value is 4, which is greater than the lower ranked neighbor (000) and less than the higher ranked neighbor (999). Accordingly, the determination is made at 706 that ranking at the first significant character is possible, and at 710 the new rank value is set to be '4'. This provides the ITS with a rank table having: minimum marker rank "000", new issue rank "4", maximum marker rank "999".

By way of second example of process 700, the ITS may maintain two issues: issue 1 with rank value of "221"; issue 2 with rank value of "225". A request may be made to rank issue 3 after issue 1, in which case the subject issue is issue 3, the higher ranked neighbor is issue 2 (rank value "225") and the lower ranked neighbor is issue 1 (rank value "221"). At 702 the initial rank value for the new issue is calculated to be: floor((221+225)/2)=223. Following 704 the significant character index is set to i=1, and at 706 a determination is made as to whether or not ranking using the first significant character is possible. In this case ranking at first significant character is not possible as the truncated initial rank value "2" is less than the rank value of the lower ranked neighbor (221). The significant character index is incremented to i=2 (at 708) and at 706 a determination is made that ranking using the first two significant characters is not possible as the truncated initial rank value ("22") less than the rank value of the lower ranked neighbor ("221"). The significant character index is incremented to i=3 (at 708). At 706 a determination is made that ranking using the first three significant characters is possible as the "truncated" initial rank value ("223") falls between the neighbor rank values ("221" and "225"). At 710 the new rank value is set to be the first three (given i=3) characters of the initial rank value calculated at 702: "223". This provides the ITS with a rank table having: issue 1 rank "221", issue 3 rank "223", and issue 2 rank "225".

Alternative processes for minimizing or reducing the length of a calculated new rank value are possible. Generally speaking process 700 operates by trying to find the shortest length rank value that falls between two neighbors. An alternative process may operate by finding the rank value near the "actual center" of the two neighbors that is no longer than the maximum length of the two neighbors. In one embodiment this involves: calculating the maximum length of the rank values of the two neighbors (both neighbors may, of course, have the same length); rounding the newly calculated rank value to that maximum rank length; checking if the rounded rank value is equal to either of the neighbors; if the rounded rank value is not equal to either the rank value of either of the neighbors returning that rank value; and if the rounded rank value is equal to either the rank value of either of the two neighbors adding an additional character.

Calculation of New Rank Values: Balancing Rank Operations

Where the rank operation is a balancing rank operation (arising from a balancing process such as that described in Section 3 below) the manner in which a new rank value is calculated differs.

In the embodiments described in Section 3, rank values include a balancing component and a normal component. The rank value calculation techniques described below relate to calculating the value of the normal rank component.

Two balancing rank operations described in Section 3 are a start balance up operation and a start balance down operation. These operations involve balancing the maximum marker issue and minimum marker issue respectively. For these operations only the balancing component of the marker issue ranks are modified.

The other two balancing rank operations described in Section 3 are a balance issue up operation and a balance issue down operation. In one embodiment, new rank values in a balance issue up rank operation and a balance issue down operation are calculated with reference to a predefined rank difference. Generally speaking, the predefined rank difference is selected with a view to spreading the issue rank values out between the available normal component rank values as defined by the issue rank scheme.

In a balance issue up rank operation the new normal component rank value for the first "real" issue (i.e. not the maximum marker issue) is calculated to be the middle of the available address range for the normal component. The new normal component rank values for all following issues (except the minimum marker) are calculated by subtracting the predefined rank difference from the normal component rank value of the higher ranked neighbor. The minimum marker a marker maintains its original normal component rank value.

In a balance issue down rank operation the new normal component rank value for the first "real" issue (i.e. not the minimum marker issue) is calculated to be the middle of the available address range for the normal component. The new normal component rank values for all following issues (except the maximum marker) are calculated by adding the predefined rank difference to the normal component rank value of the lower ranked neighbor. The maximum marker maintains its original normal component rank value.

In one embodiment, new rank values (in particular new normal component rank values) in a balancing issue up rank operation and a balancing issue down rank operation are calculated or set to have a predefined maximum rebalanced rank length. The maximum rebalanced rank length is less than the maximum allowed rank length for the normal component. For example, if the maximum normal component rank length is 253 characters, a maximum rebalanced rank length of five may be set. This defines that in a balance issue up or balance issue down rank operation new normal component rank values are calculated to have a maximum length of five characters. This still provides 36 to the power of 5 (approximately 60.5 million) normal component rank values, but where a varchar rank value field is used it allows for smaller rank values to be stored—five characters per issue (or six counting a varchar termination character) instead of 253 characters per issue. As issues are reordered they may, of course, be assigned rank values with longer rank lengths than defined by the maximum rebalanced rank length.

For example a ranking scheme may define a maximum normal component rank length of six characters with acceptable character values of 0 to 9. A maximum rebalanced rank length of three characters may be set, and a predefined rank difference of 5. In this case, as a rebalancing down process progresses (described in Section 3 below), the issues maintained by the ITS 100 will take the following normal component rank values: "000000" (the minimum marker issue); "5", "505", "51", "515", "52", "525", etc.

As an alternative example, with acceptable character values of [0-9 A-Z], if a maximum balancing rank length of six is set, and predefined rank difference of 000001, then over 2 billion issues may be ranked before "normal" space is exhausted the length of the initial rank value needs to be grown for new issues. Systems that need to handle larger issue counts will use a larger maximum balancing rank length and an appropriate predefined rank difference. Furthermore, the initial rank length and/or predefined rank difference may be recalculated/changed over the course of operating the ITS. For example, as the number of issues grows (and/or the rate at which issues are being added to the ITS increases) the initial rank length and/or the predefined rank difference may be increased.

The above rank operations have been described in the context of an ITS 100 that maintains a single ranking of all maintained issues. In some embodiments, however, the ITS 100 may maintain multiple independent rankings of the issues. For example, one rank order may be particular to an individual or a group, and different to the rank order maintained by another individual or group. This may be facilitated, for example, by including an additional field in the data structure to define the relevant user or group whose ranking scheme is being operated on. In this case a rank operation request will include information on the user/group to ensure that the ranking operation is performed on the desired user/groups ranking scheme. Having identified the relevant ranking scheme a given rank operation can proceed as described above.

2.3 Worked Example

In order to further explain the rank operation process described above this section provides a worked example. The context of this worked example is the same as the example initially discussed above in section 2.1, with the ITS 100 having issues as shown in Table 7. Table 7 includes the same issues as Table 2, as well as minimum and maximum markers (issue 5 and 6 respectively). Lock value and lock time fields have been added to the table and are initially NULL for all issues.

TABLE 7

| Issue_ID | Issue_Rank | Lock_Value | Lock_Time |
|---|---|---|---|
| 1 | AAA | | |
| 2 | AAE | | |
| 3 | AAI | | |
| 4 | AAM | | |
| 5 | 000 | | |
| 6 | ZZZ | | |

As with the above example, assume a first rank operation request is made to reorder issue 1 so it is positioned immediately before issue 4 and at around the same time a second rank operation request is made to reorder issue 4 so it is positioned immediately after issue 1.

Thread 1:

The ITS server 104 receives the first request and initiates the rank operation (at 602) by launching a first thread. A maximum runtime for thread 1 is determined (at 604). The issues relevant to the operation are determined (at 606), their values read (at 608), and a determination of whether the values are as expected is made (at 610). In this case the relevant issues and issue values (which are as expected) are: the subject issue 1 with rank value "AAA", higher ranked issue 4 with rank value "AAM", and lower ranked issue 3 with rank value "AAI"). ITS server 104 then attempts to acquire a lock on the relevant issues 1, 3, and 4 (at 618), using a UUID of (for example) 'aaff'. As none of the relevant issues are currently locked (per the NULL rank lock values in Table 7), the lock operation is successful (at 620), and as a consequence lock values and time values are written to the relevant issues as shown in Table 8 below:

TABLE 8

| Issue_ID | Issue_Rank | Lock_Value | Lock_Time |
|---|---|---|---|
| 1 | AAA | aaff | 1000000 |
| 2 | AAE | | |
| 3 | AAI | aaff | 1000000 |
| 4 | AAM | aaff | 1000000 |
| 5 | 000 | | |
| 6 | ZZZ | | |

Thread 2:

Thread 1 is then interrupted by thread 2 (i.e. the thread initiated (at 602) to perform the second rank operation request). A maximum runtime for thread 2 is determined (at 604), the issues relevant to the thread 2 rank operation are determined (at 606), and the relevant issue values are read (608): subject issue 4, rank value "AAM", locked; lower ranked neighbor issue 1, rank value "AAA", locked; and higher ranked neighbor issue 2, rank value "AAE", not locked. As issues 1 and 4 are locked the lock acquisition (at 618) is not successful. Thread 2 enters a delay (at 624), ultimately sleeping and returning control to thread 1.

Thread 1:

Thread 1 resumes operation by rereading the relevant issue values (at 626), determining these are still as expected (at 628), and calculating a new rank value for subject issue 1 (632). In this example the new rank value is calculated to be the rank between the neighbor issues (issues 3 and 4)—"AAK". Thread 1 writes the new rank value to the record in respect of issue 1 (at 634), releases the locks on the locked issues (at 636), and ends. This leaves the state of the rank table as per Table 9 below (in Table 9 the lock time values have also been reset to NULL as part of the lock release operation 636):

TABLE 9

| Issue_ID | Issue_Rank | Lock_Value | Lock_Time |
|---|---|---|---|
| 1 | AAK | | |
| 2 | AAE | | |
| 3 | AAI | | |
| 4 | AAM | | |
| 5 | 000 | | |
| 6 | ZZZ | | |

Thread 2:

With thread 1 completed, thread 2 (once its delay has ended) resumes. Thread 2 may have delayed several times at 630 over the operation of thread 1, however for the purposes of this example it will be assumed that the runtime of thread 2 did not reach the maximum allowed runtime. Thread 2 resumes by determining the issues relevant to the thread 2 rank operation (at 606) and reading the relevant issue values (at 608). In this case the relevant issues and issue values are: the subject issue 4 with rank value "AAM", lower ranked issue 1 now with rank value "AAK", and higher ranked issue 4 with rank value "AAM". In this case, the process determines that the issue values are not as expected (at 610) and that the requested rank operation is not possible (at 612). In this case this is due to the subject issue already being in the requested order. Thread 2 then ends, leaving the issue ranks as shown in Table 9 above. As can be seen, the resulting rank order is issue 2, issue 3, issue 1, issue 4, and both requests are satisfied.

2.4 Issue Rank Operation Embodiments

In one embodiment, this disclosure provides systems and methods for performing a rank operation in an ITS. The ITS maintains a plurality of issues, each issue having an associated rank value, the rank values of the plurality of issues defining an order of the plurality issues. The method comprises: receiving a rank operation request to change the rank of a subject issue; determining relevant issues to the rank operation request; attempting to acquire locks on each of the relevant issues; and in response to successfully acquiring locks on each of the relevant issues: calculating a new rank value for the subject issue, the new rank value determined in accordance the rank operation requested; and saving the new rank value for the subject issue.

The rank operation request may be a reorder request, and the relevant issues may be determined to comprise the subject issue, a higher ranked neighbor issue, and a lower ranked neighbor issue.

The reorder request may be selected from a group comprising: a rank first request being a request to rank the subject issue as the first issue in the rank order; a rank last request being a request to rank the subject issue as the last issue in the rank order; a rank before request being a request to rank the subject issue so it is ordered immediately before a specified issue; a rank after request being a request to rank the subject issue so it is ordered immediately after a specified issue.

The new rank value for the subject issue may calculated so the new rank value has a length that is less than a maximum issue rank length. The new rank value for the subject issue may be calculated so as to minimize the length of the new rank value.

The rank operation request may be a balance request, and the relevant issues may be determined to comprise the subject issue and a neighbor issue.

The balance request may be a balance down request and the neighbor issue may be a lower ranked neighbor issue. Alternatively, the balance request may be a balance up request and the neighbor issue may be a higher ranked neighbor issue.

Attempting to acquire locks on the relevant issues may comprise attempting to write lock data to a lock value field associated with each relevant issue. An attempt to acquire locks may be successful if lock data is successfully written to the lock value field associated with each relevant issue. Lock data may be prevented from being written to a given issue if the lock value field of the given issue stores a value that indicates the issue is already locked.

Attempting to acquire locks on each of the relevant issues may be performed by a single lock acquisition request, and attempting to acquire locks on the relevant issues may be successful if a returned value of the lock acquisition request indicates that lock data was written to each relevant issue.

Lock data may comprise an identifier. Lock data may comprise a unique identifier. Lock data may comprise a UUID.

Each issue may further be associated with a lock time field defining a period of time which the issue can remain locked for. If a lock time field with respect to an issue expires the issue may be unlocked. The lock time field of a given issue may be written to when a lock on that issue is acquired.

After saving the new rank value for the subject issue, the method may further comprise releasing the successfully acquired locks.

If the attempt to acquire locks is not successful, the method may further comprise implementing a delay and, following the delay, re-attempting the rank operation.

If implementing the delay results in a maximum runtime being reached or exceeded, the method may comprise terminating the rank operation in respect of the rank operation request. In this case an error message may be returned.

If the attempt to acquire locks is not successful, but in the attempt one or more of the relevant issues is locked, the method may further comprise unlocking issues that were locked in the unsuccessful lock acquisition attempt.

Unlocking issues that were locked in the unsuccessful lock acquisition attempt may be performed by a single lock release request.

3. Issue Balancing 3.1 Operational Context and Problem Domains

Over the course of operation of the ITS 100 issues are added and issue orders and rank values are modified. This may result in one or more areas of the issue rank address space becoming locally congested.

Congestion here refers to issues being assigned ranks that are so close together that the number of rank values between adjacent issues (i.e. rank values that can be assigned to other issues that may need to be reordered between those issues) becomes small or zero.

Local congestion is referred to as it is assumed for present purposes that the ITS 100 implements an issue rank scheme that defines a rank address space with significantly more ranks than the number of issues that will ever need to be ranked by the ITS 100. By way of example, consider the example address space described above which provides 36 to the power of 253 unique issue ranks. It is assumed that the ITS 100 would, however, never have need to store/track 36 to the power of 253 issues—for example, at the time of filing this application a relatively large number of issues for an ITS is considered to be 1 million issues. Accordingly, although certain areas or regions of the address space may become bunched or congested, other areas of the issue address space will be uncongested/sparsely populated.

For example, over the course of operation of the ITS 100 four issues may end up with the ranks as shown in Table 10 (presuming a maximum allowed rank length of three alphanumeric characters and a lexicographical ordering scheme).

TABLE 10

| Issue identifier | Issue Rank |
| --- | --- |
| 1 | AAA |
| 2 | DDA |
| 3 | DDB |
| 4 | DDC |
| 5 | FFF |

Should, for example, a reordering operation requesting issue 1 to be ranked after issue 3, the reordering operation cannot be completed. Given the maximum character limit of three that has been adopted for this example it is not possible to add an additional character to the rank (e.g. modifying the rank of issue 1 to be "DDBA" which would then rank between "DDB" and "DDC"). It is also not possible to select a rank falling between DDB and DDC as under the ordering system these are adjacent ranks. This illustrates the local congestion of ranks around issue 3 and issue 4 (having rank values of DDB and DDC respectively). It also illustrates that there is relatively limited (or no) congestion in other areas—there being a large number of available ranks between issue 1 and issue 2 (having rank values of AAA and DDA respectively) and between issue 4 and issue 5 (having rank values of DDC and FFF respectively).

In this example, the only way to rank issue 1 between issue 3 and issue 4 without changing the underlying issue rank scheme is to re-rank at least one of issue 3 or issue 4 to create available issue ranks between them. This type of operation will be referred to as an issue balancing operation. In an issue balancing operation the rank values of one or more issues are changed, but the order of the issues maintained by the ITS 100 is not altered—i.e. after a balancing operation no issue has changed to be ordered before an issue it was previously ordered after, or to be ordered after an issue it was previously ordered before.

Returning to the above example, on detecting the congestion that prevents a reordering operation one option is to pause the reordering operation and instigate a balancing operation that re-ranks issue 4 to create space between issue 4 and issue 3 (e.g. by re-ranking issue 4 to have a rank value of EEE). Having to pause the reordering operation, however, impacts on the performance experienced by the user or process awaiting completion of that operation. Furthermore, this solution does not address the congestion between issues 2 and 3 (having ranks DDA and DDB respectively).

An alternative option would be to lock up the entire ranking data structure to redistribute issues more evenly. While the data structure is so locked, however, no other issue ranking operations (e.g. issue reordering operations) could be performed. This would be a significant interruption to users of the ITS.

Accordingly, there is a need for techniques that improve the management of issues in such a way as to avoid, or at least reduce, the occurrence of issue rank clustering.

3.2 Implementation

In one embodiment a global rebalancing process is provided in which all issues maintained by the ITS are rebalanced in order to alleviate rank congestion. In order to facilitate issue balancing the issue ranking scheme defines that issue rank values include one or more characters that make up a balancing component and define a balancing rank. This balancing component is to be contrasted with the characters making up a normal component of a rank value, which is used in normal issue reordering operations. In the examples described in Section 2 above, the rank characters were all part of a normal component. I.e. in the three character issue ranks ("AAA", "BBB", etc.) all three characters comprised the normal component, and were used in the normal rank ordering of issues.

Part of the ordering system for a ranking scheme is the significance attached to each character in a rank value. This defines the order in which the various characters making up an issue rank value are considered. Generally speaking, the characters in a given issue rank value sequentially range from a most significant character of the issue rank value to a least significant character of the issue rank value. Although unusual, custom order systems may define alternative—and potentially non-sequential—character significance orders.

For example, in the three alphanumeric character issue values described above (giving an issue rank value such as "ABC") the lexicographical order system defined the first/leftmost character (in this case 'A') to be the most significant character and the last/rightmost character (in this case 'C') to be the least significant character. As a consequence of this, rank value "ABB" ranks before rank value "BBA". If the character significances were reversed, however (e.g. if the ordering system defined the rightmost character to be the most significant character and the left most to be the least significant character), rank value "ABB" would rank after rank "BBA". Unless stated otherwise, and for ease of human readability, the ordering systems used herein presume/define the most significant character to be the first/leftmost character of a rank value.

The balancing component of an issue rank value is of greater significance (from an ordering perspective) than the normal component of that issue rank value. In general terms, an issue scheme defines a maximum allowed rank length of n characters, a balancing component comprising a of the n characters, and a normal component comprising b of the n characters. Although issue ranks in this Section are described in terms of a balancing component and a normal component, it is important to note that these two components can be read together and treated as a single or unitary rank value when determining the rank order of an issue.

If all n characters are used by the balancing and normal components of a rank value $a+b=n$. In some cases, however, one or more of the rank value characters may be used for other purposes, in which case $a+b<n$. Even where characters are used for other purposes they are still treated as part of the single/unitary rank value when determining rank order.

For the purposes or description, the rank values described in this Section will take the following format: "0|AAA", defined as follows. Rank values are defined to have a maximum allowed rank length of five characters ($n=5$). A balancing component of one character ($a=1$) is defined, the balancing component being the most significant character of the rank value (the character '0' in the rank value "0|AAA"). The balancing component character is defined to have acceptable values of 0, 1, or 2, thereby defining three balancing ranks. One reserved character is defined, being the next most significant character after the balancing component. In this case the reserved character is a pipe character '|', provided solely for the purposes of human readability, and is not a necessary inclusion in the issue ranking scheme. The pipe character is a static character, in the sense that it is the same in all rank values—a consequence of which being that it has no impact on rank ordering. The normal component is defined to have a maximum of three characters (a=3) being the least significant three characters of the rank value (the characters "AAA"' in the rank value "0|AAA"). In this example the normal component is the same as the rank scheme used in the rank operation examples described in Section 2 above: i.e. a maximum normal component length of three characters, each character defined to have acceptable values of 0 to 9 or A to Z. The normal component therefore describes 36 to the power of 3 (46656) normal component ranks.

The balancing component of a rank value can be thought of as defining a particular bucket in which a normal rank (as defined by the normal component of the rank value) is held. For example, the rank value of "0|AAA" can be thought of as an issue with normal rank "AAA" (the normal component of the rank value) which is held in bucket "0" (the balancing value as defined by the balancing component of the rank value). In contrast, a rank value of "1|BBB" can be thought of as an issue with normal rank "BBB" which is held in bucket "1". The number of balancing values (or buckets) defined by an issue ranking scheme is defined by the number of characters in the balancing component and the possible values of those characters.

While issue ranks of the format "0|AAA" are used to describe the principles of this embodiment, issue rank schemes of actual ITS implementations will typically define far larger issue rank formats. As an example, an issue rank format for an actual ITS may be defined as having: a maximum allowed rank length of 255 characters (n=255); a balancing component of one character (a=1), the balancing component being the most significant character of the rank value and having acceptable values of 0, 1, or 2; a static pipe character, being next most significant character after the rank component; and a normal component having a maximum of 253 characters, being the next most significant characters after the pipe character. This provides for rank values of the form: "0|AAA . . . A". The balancing component of this rank format provides for three balancing values (0, 1, or 2). The normal component of this format provides for 36 to the power of 253 normal rank values. Relevantly, and as discussed above, the normal component of the rank format provides ample normal rank values (36 to the power of 253) to rank the number of issues that will need to be maintained by the ITS 100. As such the balancing component is not added or included out of a need to extend the number of issue ranks—this is not its purpose. Rather, the purpose of the balancing component is to facilitate the balancing of issues.

More generally, and within any environmental limitations (e.g. maximum field lengths or the like) an issue ranking scheme may define one or more balancing characters, one or more special/reserved characters, and one or more normal component characters as desired. The one or more balancing characters (and their allowed values) must define at least two distinct balancing ranks (i.e. at least two buckets). The number of normal component characters (and their allowed values) will typically define a number of normal ranks that is ample to rank the number of issues that the ITS 100 is likely to need to maintain.

In addition to defining balancing and normal components, the issue rank scheme also defines a balancing progression. The balancing progression defines the order in which balancing ranks (as defined by the balancing component) are transitioned through. For example, where only two balancing values are defined (e.g. 0 and 1), then the order of balancing is from 0 to 1, and from 1 back to 0. Where n balancing issues are defined, the balancing order may be: sequentially up with a reset from the highest balancing rank back to the lowest balancing rank—i.e. 0 to 1, 1 to 2, . . . , (n−1) to n, n to 0, 0 to 1, etc.; sequentially down with a reset from the lowest balancing rank back to the highest balancing rank—i.e. 0 to n, n to (n−1), . . . , 2 to 1, 1 to 0, 0 to n, etc.; oscillating—i.e. 0 to 1, 1 to 2, . . . , (n−1) to n, n to (n−1), . . . , 2 to 1, 1 to 0, 0 to 1, etc.; or a custom defined progression. A single balancing process from one balancing component value to another balancing component value (i.e. from one bucket to another) will either be a balancing up process in which issues are balanced from a lower balancing rank to a higher balancing rank, or a balancing down process in which issues are balanced from a higher balancing rank to a lower balancing rank.

In certain environments, balancing in a particular direction (e.g. up or down) may be more efficient. In such environments the number of balancing ranks defined by the balancing component and the balancing progression can be selected to take advantage of this. For example, in a particular environment balancing up may be more efficient than balancing down. For this environment a single character balancing component may be used with acceptable values of 0-9 or A-Z (providing a total of 36 balancing ranks), and a balancing progression that balances sequentially upwards with a reset. In this case a greater number of more efficient balancing up processes (36) can be performed for each less efficient downward balancing down process.

Figure 8:
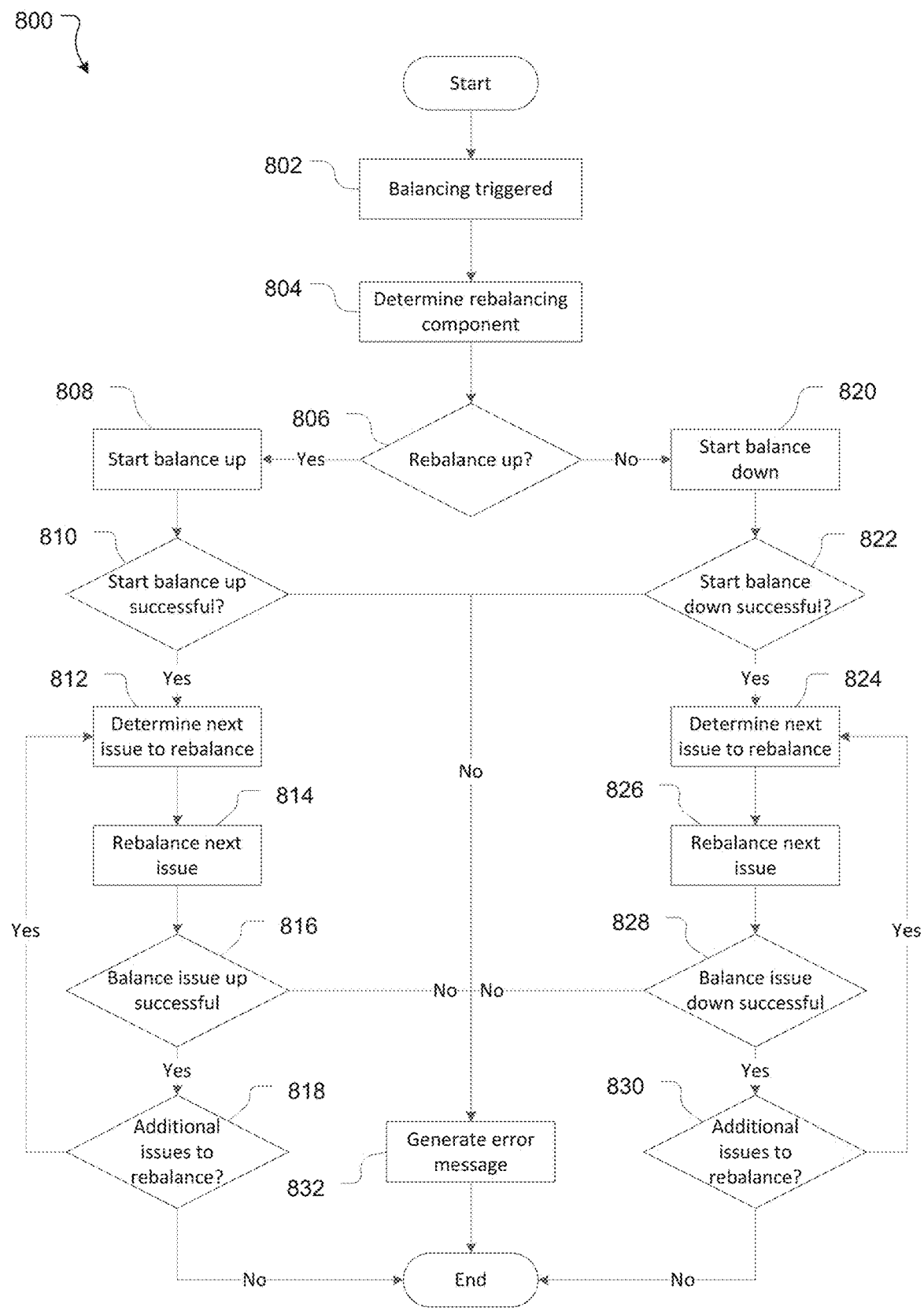
FIG. 8 illustrates a process of balancing issues.

FIG. 8 illustrates a process 800 of balancing issues maintained by the ITS 100. Prior to process 800 being performed, all issues maintained by the ITS 100 have the same balancing component rank (i.e. are held in the same bucket). In the case of a new ITS 100 that has not undergone a balancing process, all issues will have the same balancing rank as they will have been assigned the same balancing rank on creation. For an existing ITS 100 that is being updated to provide issues with a balancing component (in addition to their previously existing normal component), all issues are given the same balancing component.

At 802, the balancing process is triggered. Balancing may be triggered in a variety of ways. For example, balancing may be manually triggered by a user on detection that the ranking address space has become congested in one or more areas. Balancing may be triggered based on a defined balancing schedule—i.e. ITS 100 is configured to perform a balancing process every x days/weeks/months. Balancing may also be automatically triggered, for example as is described in Section 3 below.

In a multiple server (or clustered) environment, only one node/ITS server 104 should perform balancing of the rank system at a time. To this end, in a clustered environment a check (not depicted) is made before commencing a balancing process to ensure that a balancing process is not currently in progress under the control of another node. This check may be performed in a variety of ways, for example by reference to a cluster wide balancing lock. If the balancing lock indicates balancing is currently being performed, another balancing process is not commenced. If the balancing lock does not indicate that balancing is currently being performed the balancing lock is set and the balancing process proceeded with. In this case once the balancing process has completed the balancing lock is released.

At 804, the process determines a new balancing component rank. The new balancing component rank is based on the existing balancing component rank of the issues maintained by the ITS, the allowed balancing component rank values, and the balancing progression. The new balancing component rank defines the bucket into which the issues will be balanced over the course of the balancing process.

In the example ranking scheme described above, the balancing component comprises a single character having allowed values of 0, 1, or 2. In this embodiment the balancing progression is a sequential upward progression with a reset (i.e. issues are balanced from balancing rank 0 to balancing rank 1, from balancing rank 1 to balancing rank 2, and from balancing rank 2 to balancing rank 0).

At 806, the process determines whether the process is a balancing up process or a balancing down process. This determination is based on the existing balancing component rank and the new balancing component rank determined at 804. If the existing balancing component rank is lower than the new balancing component rank the process will be a balance up process. If the existing balancing component rank is higher than the new balancing component rank the process will be a balance down process.

The balancing up and balancing down processes are similar. The general difference is that in a balancing up process issues are balanced in order from highest to lowest (i.e. the highest ranked issues are balanced first), while in a balancing down process issues are balanced in order from lowest to highest (i.e. the lowest ranked issues are balanced first). This ensures that the balancing process does not affect the relative order of the issues maintained by the ITS 100. The operations involved in a balance up process will be described first, followed by the operations involved in a balance down process.

The balance up process is started at 808 by balancing the maximum marker to the new balancing component rank. This involves assigning the new balancing component rank to the maximum marker (i.e. moving the maximum marker to the new bucket).

In one embodiment the maximum marker is moved by requesting a start balance up operation, which is a type of rank operation as described in Section 2 above. For a start balance up rank operation the relevant issues (determined at 606) are the maximum marker issue and the issue with the next highest rank (i.e. the highest ranked "real" issue maintained by the ITS 100). Provided the data with respect to these issues is as expected (determined at 610), locks on the relevant issues are successfully acquired (determined at 620), and the data with respect to the relevant issues is still as expected (determined at 628), a new rank value is determined (at 632). The new rank value of the maximum marker comprises the new balancing rank (determined at 804) and the preexisting normal component of the maximum marker. The new rank value is then saved (at 634) and the acquired locks released (at 636).

At 810 the process determines whether the start balance up operation was successful. In this embodiment success is determined by receiving a returned value from the rank operation indicating success (e.g. from 616). Alternatively, success may be determined by a predefined time period elapsing without receiving a failure message.

At 812, in response to determining the start balance up operation was successful, the process determines the next issue to be balanced. The next issue to be balanced in a balance up process is the highest ranked issue with the original balancing component rank value (i.e. the highest ranked issue that is in the original bucket).

At 814 the process balances the next issue (as determined at 812).

Balancing an issue generally involves calculating a new rank value for the issue and saving that new rank value. The new rank value is a combination of a new balancing component rank value (as determined at 804) and a new normal component rank value. The new normal component rank value is calculated so that as the balancing process progresses the issues maintained by the ITS are given normal component rank values that distribute them within the normal rank component address space. This results in any congested areas being decongested. By using a balancing component as described, the ITS 100 can reorder issues within the normal rank component address space without concern that doing so will change the actual order of the issues relative to one another. Put alternatively, the order of an issues immediately before the balancing operation in respect of a given issue is the same as the order of the issues immediately after the balancing operation in respect of the given issue. The balancing component of the rank is used to ensure that the overall order of the issues is maintained.

In one embodiment the next issue is balanced by requesting a balance issue up operation in respect of the issue determined at 812. This is a type of rank operation as described in Section 2 above, the relevant issues for which (as determined at 606) being the subject issue and a higher ranked neighbor. The subject issue is the issue being balanced as determined at 812, and may be the minimum marker issue. The higher ranked neighbor is the issue with the next highest rank to the subject issue, and may be the maximum marker issue. For a balance issue up rank operation, the subject issue and higher ranked neighbor should have different balancing component ranks (as defined by the value(s) of the balancing component). Accordingly, determining whether the relevant issue data is as expected for a balance issue up operation (at 610) involves checking that the balancing rank of the subject issue is different to the balancing rank of the higher ranked neighbor. If the balancing ranks of these issues are the same, this is not expected. This may (for example) indicate that another rank operation has ordered an issue between the subject issue determined at 812 and the intended higher ranked neighbor issue. In this case the intervening issue should be balanced before the subject issue is balanced.

As per the rank operations described in Section 2 above, if the relevant issue data is as expected, locks on the relevant issues are successfully acquired (as determined at 620), and the data with respect to the relevant issues is still as expected (as determined at 630), a new rank value for the subject issue is determined (at 632).

The balancing component of the new rank value in a balance up operation is the new balancing rank determined at 804. As described in Section 2 above, in one embodiment the new normal component value in a balance up operation is (except for the minimum marker) calculated by subtracting a predefined rank difference from the normal rank of the higher ranked neighbor. As described in Section 2, this calculation may be performed within the constraint of a maximum balancing rank length (i.e. a maximum length that the calculated normal component of the new rank value can take). When the minimum marker is balanced in a balance up operation it maintains its original normal component rank value.

Once calculated the new rank value is saved (at 634) and the acquired locks released (at 636).

At 816 the process determines whether the balance issue up operation was successful (e.g. by receipt or otherwise of a success message returned by 616).

At 818 the process determines whether further issues require balancing. This may be achieved in a variety of ways. In one embodiment, in a balance up process if the last issue moved was the minimum marker the process will determine that no further issues require balancing. Alternatively, the process may determine that no further issues require balancing if all issues have the same balancing component.

If further issues require balancing the process returns to 814 to determine the next issue to be balanced.

If no further issues require balancing the balancing process ends. In some embodiments the completion of the balancing operation is recorded and/or a message to this effect is sent.

As noted, the balance down process is, in many respects, similar to the balance up process. The balance down process is started at 820 by balancing the minimum marker to the new balancing rank. This involves assigning the new balancing rank to the minimum marker (i.e. moving the minimum marker to the new bucket).

In one embodiment the minimum marker is moved by requesting a start balance down operation. This is a rank operation as described in Section 2 above. For a start balance down rank operation the relevant issues (as determined at 606) are the minimum marker issue and the issue with the next lowest rank (i.e. the lowest ranked "real" issue maintained by the ITS 100). Provided the data with respect to these issues is as expected (610), locks on the relevant issues are successfully acquired (620), and the data with respect to the relevant issues is still as expected (628), a new rank value is determined (632). The new rank value of the minimum marker comprises the new balancing rank (determined at 804) and the preexisting normal component of the minimum marker. The new rank value is then saved (634) and the acquired locks released (636).

At 822 the process determines whether the start balance down operation was successful.

At 824, if the start balance down operation was successful, the process determines the next issue to be balanced. The next issue to be balanced in a balance down process is determined to be the lowest ranked issue with the original balancing rank (i.e. the lowest ranked issue that is in the original bucket).

At 826 the process balances the next issue (as determined at 824).

In one embodiment the next issue is balanced by requesting a balance issue down operation in respect of the issue determined at 824, which is a rank operation (as described in Section 2 above). For a balance issue down rank operation the relevant issues (as determined at 606) are the subject issue and a lower ranked neighbor. The subject issue is the issue being balanced as determined at 824, and may be the maximum marker issue. The lower ranked neighbor is the issue with the next lowest rank to the subject issue, and may be the minimum marker issue. For a balance issue down rank operation, the subject issue and lower ranked neighbor should have different balancing ranks (as defined by the value(s) of their balancing components). Accordingly, determining whether the relevant issue data is as expected for a balance issue down operation (at 610) involves checking that the balancing rank of the subject issue is different to the balancing rank of the lower ranked neighbor. If the balancing ranks of these issues are the same, this is not expected.

If the relevant issue data is as expected, locks on the relevant issues are successfully acquired (as determined at 620), and the data with respect to the relevant issues is still as expected (as determined at 630), a new rank value for the subject issue is determined (at 632).

The balancing component of the new rank value in a balance down operation is the new balancing rank determined at 804. As described in Section 2 above, in one embodiment the normal component value of the new rank in a balance down operation is (except for the maximum marker) calculated by adding a predefined rank difference to the normal component rank value of the lower ranked neighbor. As described in Section 2, this calculation may be performed within the constraint of a maximum balancing rank length. When the maximum marker is balanced in a balance down operation it maintains its original normal component rank value.

Once calculated the new rank value is saved (at 634) and the acquired locks released (at 636).

At 828 the process determines whether the balance issue down operation was successful (e.g. by receipt or otherwise of a success message returned by 616).

At 830, in response to determining the balance issue down operation was successful, the process determines whether further issues require balancing. This may be achieved in a variety of ways. In one embodiment, in a balance down process if the last issue moved was the maximum marker the process will determine that no further issues require balancing. Alternatively, the process may determine that no further issues require balancing if all issues have the same rank value.

If further issues require balancing the process returns to 824 to determine the next issue to be balanced.

If no further issues require balancing the balancing process ends. In some embodiments the completion of the balancing operation is recorded and/or a message to this effect is sent.

At a number of points during the balance up process (at 810 and 816) and the balance down process (822 and 828) a determination is made as to the success of a balance rank operation. In one embodiment, at 832, if any of these rank operations is unsuccessful—determined, for example, by receiving an error message or due to a request timing out—the process generates and communicates a balance error message and ends. In alternative embodiments if a balance operation is unsuccessful a delay may be implemented (for example in a similar manner to the delay described at 624 above) and, provided a maximum runtime for the balancing operation has not been exceeded, the balancing operation retried. This may be appropriate where balance operations (as attempted at 808, 814, 820 or 826) are performed by an alternative rank operation process to that described in Section 2 above, and the alternative rank operation process does not itself involve retrying a rank operation on an initial failure.

By compartmentalizing issue ranks into a balancing component and a normal rank component it is possible to balance issues from one bucket to another without impacting the order of the issues maintained by the ITS. This also allows for balancing of issues to occur without locking up the entire data structure. This is advantageous as in some circumstances a balancing can take a long time and it is not acceptable for the data structure to be inaccessible over that period. For example, in the process described above it is entirely possible for a request to reorder issues to be received and processed during rebalancing. In this case the reorder and balancing processes can carry on as normal and in parallel without interfering with one another.

In an alternative implementation, buckets are defined without using a balancing component. In this embodiment, rather than dedicating one or more characters to explicitly defining a balancing rank different buckets are defined by ranges of rank values within the allowable rank values as defined by the issue ranking scheme.

For example, in a ranking scheme defining a maximum rank length of three and available characters as 0-9, the ITS may define a first "bucket" to be the rank values of "000"-"499" and a second "bucket" to be the rank values of "500"-"999". In this case the "current" bucket into which issues are being ranked is defined by the minimum and maximum markers. For example, initially the first bucket may be used in which case minimum and maximum marker issues are set to the boundary rank values for that range defining that bucket—in this case "000" and "499". As a consequence, issue rank operations will result in issues being between these values.

When a rebalance operation is triggered a new bucket is selected. This may be according to a rebalance progression as described above, though in this case the rebalance progression defines the new range of rank values that will define the next bucket. Continuing the example above, the balance progression will define the next bucket to be defined by the range "500" to "999" (which, in this case, will be a balance up operation). The rebalancing up operation is performed by first changing rank value of the maximum marker to the upper boundary of the new bucket range—in this case to "999". All issues maintained by the ITS are then balanced up in a similar fashion to that described above—i.e. higher ranked issues being rebalanced before lower ranked issues—with the exception that no balance component needs to be calculated. New rank values may be calculated, for example, by subtracting a predefined number of issue ranks from the higher ranked neighbor of the specific issue being balanced (the predefined number of issue ranks defined with reference to the number of ranks defined by the bucket range). Once all issues have been balanced, the minimum marker is then moved to lower boundary of the bucket range—in this case "500". Following the rebalancing issues will be ranked in the new bucket—between "500" and "999", and as the minimum and maximum markers now define the boundaries of the range all new rank operations will rank issues within that bucket.

Balancing down is similarly achieved. Initially the rank value of the minimum marker is set to the lower boundary of the bucket range. Issues are then sequentially balanced into the new range from the lowest ranked issue to the highest ranked issue. New rank values may be calculated, for example, by adding a predefined number of issue ranks to the lower ranked neighbor of the specific issue being balanced (the predefined number of issue ranks defined with reference to the number of ranks defined by the bucket range). Lastly the rank of the maximum marker is set to the upper boundary of the bucket range.

The ITS may divide the available issue ranks into multiple buckets by defining multiple distinct ranges within the issue ranks defined by the issue ranking scheme. Typically, each bucket will define significantly more rank values than the number of issues it is envisaged the ITS will need to maintain.

For example in an issue ranking scheme providing issue ranks from 0,000,000 to 9,999,999 three buckets may be defined, each having around 3,333,330 usable rank values (noting two rank values are lost to the minimum and maximum markers). In this example: bucket 1 is defined by the rank value range 0,000,000 to 3,333,333; bucket 2 is defined by the rank value range 3,333,334 to 6,666,666; and bucket 3 is defined by the rank value range 6,666,667 to 9,999,999. When bucket 1 is the active bucket, the minimum marker is ranked 0,000,000, the maximum marker is ranked 3,333,333, and issues take rank values 0,000,001 to 3,333,332. When bucket 2 is the active bucket, the minimum marker is ranked 3,333,334, the maximum marker is ranked 6,666,666, and issues take rank values 3,333,335 to 6,666,665. When bucket 3 is the active bucket, the minimum marker is ranked 6,666,667, the maximum marker is ranked 9,999,999, and issues take rank values 6,666,668 to 9,999,998.

3.3 Worked Example

In order to further explain the balancing process described above, this Section provides a worked example. For this worked example the current state of the ITS 100 is as shown in Table 11. This example works on the issue rank scheme described above: a single character balancing component being the most significant character and capable of taking the values 0, 1, and 2; a pipe character as the next most significant character; a maximum normal component length of three, each character capable of taking any value of 0 to 9 or A-Z; and a balancing progression of balancing rank 0 to balancing rank 1, balancing rank 1 to balancing rank 2, and balancing rank 2 to balancing rank 0.

Table 11 depicts four "real" issues 1, 2, 3, and 4, a minimum marker issue 5, and a maximum marker issue 6. Each issue has an initial balancing rank (defined by the balancing component) of 0:

TABLE 11

| Issue_ID | Issue_Rank |
|---|---|
| 1 | 0\|XXA |
| 2 | 0\|XXB |
| 3 | 0\|XXC |
| 4 | 0\|XXD |
| 5 | 0\|000 |
| 6 | 0\|ZZZ |

As can be seen, the example issues illustrated in Table 11 are congested as there are no more normal component rank values between any of issues 1, 2, 3, or 4.

Once the balancing process has been triggered (at 802), the process determines the next balancing rank to be 1 (at 804). This is based on the current balancing rank of the issues, the available balancing ranks, and the balancing progression.

The process then determines that a balance up process will be performed (at 806) given the new balancing rank of 1 is higher than the existing balancing rank of 0.

The process then starts balancing up (at 808) by balancing the maximum marker row. Following this operation the rank table is as shown in Table 12:

TABLE 12

| Issue_ID | Issue_Rank |
|---|---|
| 1 | 0\|XXA |
| 2 | 0\|XXB |
| 3 | 0\|XXC |
| 4 | 0\|XXD |
| 5 | 0\|000 |
| 6 | 1\|ZZZ |

The process then determines the next issue to be balanced (at 812)—issue 4, and balances issue 4. The process then balances issue 4. In this example the new normal rank is calculated to be "H00", giving issue 4 a rank of "1|H00" as shown in Table 13 below:

TABLE 13

| Issue_ID | Issue_Rank |
| --- | --- |
| 1 | 0|XXA |
| 2 | 0|XXB |
| 3 | 0|XXC |
| 4 | 1|H00 |
| 5 | 0|000 |
| 6 | 1|ZZZ |

The process then determines that there are additional issues to be balanced (at 818). The process proceeds by balancing issue 3 (with, in this example. a rank of "1|G00"), followed by issue 2 (with, in this example. a rank of "1|F00") Following these two operations the rank table is as shown in Table 14:

TABLE 14

| Issue_ID | Issue_Rank |
| --- | --- |
| 1 | 0|XXA |
| 2 | 1|F00 |
| 3 | 1|G00 |
| 4 | 1|H00 |
| 5 | 0|000 |
| 6 | 1|ZZZ |

As can be seen, following this operation the normal component rank of issue 2—"F00"—is (if taken alone) ranked before the normal component rank of issue 1—"XXA". The balancing component, however, ensures that the original order of the issues is maintained, with "1|F00" still ranked after "0|XXA".

The process then determines that there are additional issues to be balanced (818), determines (at 812) the next issue to be issue 1, and balances issue 1 giving it a new rank value of "1|E00". The minimum marker (issue 5) is then balanced and given a new rank value of "1|000" (issue 5 retaining its original normal rank component value due to being the minimum marker). After balancing issue 5 the process determines that no further issues to balance. On completion of the balancing the rank table is as shown in Table 15:

TABLE 15

| Issue_ID | Issue_Rank |
| --- | --- |
| 1 | 1|E00 |
| 2 | 1|F00 |
| 3 | 1|G00 |
| 4 | 1|H00 |
| 5 | 1|000 |
| 6 | 1|ZZZ |

The worked balancing example has presumed no intervening reordering operations occurred during balancing. Given this, and as can be seen, the order of the issues relative to one another throughout the balancing process, and on completion of the balancing process, is the same as the order of the issues relative to one another before the balancing process commenced. On completion of the balancing process, however, the congestion has been alleviated with multiple potential ranks now existing between issues 1, 2, 3, and 4.

In order to illustrate an implementation making use of a maximum balancing rank length an additional rebalancing example will be briefly described. This example presumes: a single character balancing component being the most significant character and capable of taking the values 0, 1, and 2; a pipe character as the next most significant character; a maximum normal component rank length of 5, each character capable of taking any integer value 0 to 9; a balancing progression of balancing rank 0 to balancing rank 1, balancing rank 1 to balancing rank 2, and balancing rank 2 to balancing rank 0; a maximum balancing rank length of two; and a predefined rank difference of five. Table 16 depicts the starting point for the rebalancing process:

TABLE 16

| Issue_ID | Issue_Rank |
| --- | --- |
| 1 | 2|33334 |
| 2 | 2|33335 |
| 3 | 2|33336 |
| 4 | 2|33337 |
| 5 | 2|0 |
| 6 | 2|99999 |

Once the balancing process has been triggered (at 802), the process determines the next balancing rank to be 0 (at 804). The process then determines that a balance down process will be performed (at 806) given the new balancing rank of 0 is lower than the existing balancing rank of 2.

The process then starts balancing down (at 820) by balancing the minimum marker row. Following this operation the rank table is as shown in Table 17:

TABLE 17

| Issue_ID | Issue_Rank |
| --- | --- |
| 1 | 2|33334 |
| 2 | 2|33335 |
| 3 | 2|33336 |
| 4 | 2|33337 |
| 5 | 0|0 |
| 6 | 2|99999 |

The process then determines issue 1 to be the next issue to be balanced (at 824) and balances issue 1. The balancing component of issue 1 is set to 0. The new normal component value of issue is calculated within the bounds of a maximum balancing rank length of two and a predefined rank difference of 05. Accordingly, the new normal component value is the normal component rank value of the lower ranked neighbor (issue 4, "00") plus the predefined rank difference (5), giving a new normal component value of "05". This is shown in Table 18 below:

TABLE 18

| Issue_ID | Issue_Rank |
| --- | --- |
| 1 | 0|05 |
| 2 | 2|33335 |
| 3 | 2|33336 |
| 4 | 2|33337 |
| 5 | 0|0 |
| 6 | 2|99999 |

The process then determines that there are additional issues to be balanced (at 830), determines issue 2 to be the next issue to be balanced (at 824), and balances issue 2. The new normal component value for issue 2 is calculated to be the normal component of the lower ranked neighbor (issue 1, 05) plus the predefined rank difference (5), giving a new normal component value of 1. In a similar fashion issues 3 and 4 are rebalanced (in that order). The maximum marker issue is then rebalanced, ending up in the rankings as shown in Table 19:

TABLE 19

| Issue_ID | Issue_Rank |
|---|---|
| 1 | 0\|05 |
| 2 | 0\|1 |
| 3 | 0\|15 |
| 4 | 0\|2 |
| 5 | 0\|0 |
| 6 | 0\|99999 |

As with the previous worked example, the order of the issues relative to one another throughout the process, and on completion of the process, is the same as the order of the issues relative to one another before the balancing process commenced. In addition to alleviating congestion, the process has also reduced the normal component rank lengths to a maximum of two (excepting the minimum and maximum markers).

3.4 Issue Balancing Embodiments

In one embodiment, this disclosure provides systems and methods for performing an issue balancing process in an ITS. The process comprises: defining an issue ranking scheme which defines allowable rank values and a plurality of issue buckets; maintaining a plurality of issues, each issue having an associated issue rank within the issue ranking scheme which defines the order of the issue with respect to other issues; performing one or more balancing operations, each balancing operation being in respect of a given issue and comprising: determining a new rank value for the given issue, the new rank value resulting in the given issue being moved from a current bucket to a new bucket, and wherein the balancing operation does not affect the order of the given issue with respect to other issues.

Issue buckets may be defined by ranges of issue rank values. Determining a new rank value in a balancing operation may comprise determining a new rank value falling within the range of rank values defining the new bucket. A balance operation may be a balance down operation, and a new rank value may be determined by adding a predefined rank difference to a rank value of a previously rebalanced issue. Alternatively, a balance operation may be a balance up operation, and a new rank value may be determined by subtracting a predefined rank difference to a rank value of a previously rebalanced issue.

The rank value of a given issue may comprises a balancing component and a normal component which are read together as the rank value, and the issue buckets may defined by the balancing component of the rank value.

The balancing component may be of a greater significance than the normal component from an order determination perspective.

Determining a new rank value in a balancing operation may comprise determining a new balancing component rank value defining the new bucket and determining a new normal component rank value defining a rank within the new bucket.

A balance operation may be a balance down operation, and a new normal component rank value may be determined by adding a predefined rank difference to a normal rank value of a previously rebalanced issue. A balance operation may be a balance up operation, and a new normal component rank value may be determined by subtracting the predefined rank difference to a normal rank value of a previously rebalanced issue.

Determining a new rank value may comprise determining the new rank value to have a rank length of less than a maximum issue rank length.

The balancing process may comprise sequentially performing balancing operations on all issues maintained.

The method may further comprise determining a direction of the balancing process.

The direction of the balancing process may be determined with reference to relative rankings of the current bucket the issues are ranked in and the new bucket the issues are to be balanced into. If the new bucket has a higher rank than the current bucket a balance up process may be determined. If the new bucket has a lower rank than the current bucket a balance down process may be determined.

If the balancing process is determined to be a balance up process, the balancing process may comprise performing balancing operations on higher ranked issues before lower ranked issues. The balancing up process may comprise first balancing a maximum marker, the maximum marker defining a maximum rank value.

If the balancing process is determined to be a balance down process, the balancing process may comprise performing balancing operations on lower ranked issues before higher ranked issues. The balancing down process may comprise first balancing a minimum marker, the minimum marker defining a maximum rank value.

A balancing operation may be a rank operation, and may be performed in accordance with a balancing rank operation as described in Section 2 above.

4 Rebalancing Trigger 4.1 Operational Context and Problem Domains

As described above, congestion in an ITS ranking is problematic, but can be alleviated by balancing the issues.

One way of determining when issues should be balanced is to wait for a reordering operation to fail. For example, a reordering rank operation will fail if there are no available ranks between two issues and a user requests to place a third issue between those two issues. An example of this is discussed in relation to Table 10 above. While a failed reorder operation can be used to trigger a balancing of the issues maintained by the ITS, relying on this as the sole trigger is undesirable as it relies on an operation to fail which will impact on the performance of the system and, potentially irritate users.

As an alternative, a decision could be made to routinely perform a balancing process at a defined frequency—e.g. every x days/months/years. If the frequency chosen is sufficiently high this should reduce the likelihood of reordering operations failing due to congestion, but does not guarantee it. Furthermore, it may result in rebalancing processes being performed when there is no real congestion in the ranking system, in which case the rebalancing process is unnecessary and wastes resources.

A further alternative way of determining when issues should be balanced may be to periodically scan the rankings of the issues maintained by the ITS, looking for congestion—e.g. areas where issue ranks are close together. Performing such a scan, however, may be computationally intensive (particularly if the ITS maintains multiple distinct rankings for the issues maintained), and as such may also impact on performance.

Accordingly here is a need for a better way to determine when an issue balancing operation in an ITS should be performed.

4.2 Implementation

In one embodiment, a rebalancing trigger is defined. Activation of the rebalancing trigger results in a balancing process being commenced or scheduled to commence.

Generally speaking, a rebalancing trigger is based on a new issue rank value that is calculated during a rank operation, and in particular the length of a new issue rank value. If in a rank operation a new issue rank value is calculated that has a length exceeding a predefined trigger length, a rebalancing process is triggered.

Activation of a rebalancing trigger may result in a balancing operation commencing immediately. In one embodiment, however, triggering of a balancing process does not result in the balancing process commencing immediately. Instead, once a balancing process has been triggered commencement is delayed. The delay may be defined so that the balancing process commences at a time that is expected to be a low activity time for the ITS (i.e. a time when users are performing relatively few rank or other ITS operations—e.g. during the night or early morning). In this way any impact of the balancing process on users is reduced.

In one embodiment the delay associated with a particular rebalancing trigger is related to the predefined trigger length for that rebalancing trigger. Generally speaking, a predefined trigger length that is relatively close to the maximum allowed rank length will have a relatively short delay. This is because activation of the trigger will be an indication of relatively high congestion. Conversely, a predefined trigger length that is relatively short compared to the maximum allowed rank length will have a longer delay as activation of the trigger is indicative of less congestion in the rank address space.

For example, if an issue ranking scheme defines a maximum allowed rank length of six characters, each character taking a value between 0 to 9 and A to Z, a particular rebalancing trigger may have a predefined trigger length of five (five being relatively close to the maximum allowed rank length of six). In this case, activation of the trigger means that a rank value of five characters has been calculated during a rank operation—e.g. "AAAAA". Should a rank value for another issue be calculated as an adjacent five character rank value (e.g. "AAAAB") then only 36 more issues can be ranked between those two issue (i.e. "AAAAA0" to "AAAAAZ"), and as such a balancing operation should be scheduled to commence with a relatively small delay. Conversely, a rebalancing trigger may have a predefined trigger length of three (three in this case being relatively short compared to the maximum allowed rank length of six). In this case, activation of the trigger means that a rank value of three characters has been calculated—e.g. "AAA". Should a rank value for another issue be calculated as an adjacent three character rank value (e.g. "AAB") there are still 36 to the power of three (46656) available ranks between these two issues (i.e. "AAAAAA" to "AAAZZZ"). In this case a longer delay before commencing the balancing process is acceptable.

In one embodiment, multiple rebalancing triggers are defined. In this embodiment each rebalancing trigger has a different predefined trigger length and a different associated delay period that, when the trigger is activated, is instigated before a balancing process is commenced. Where multiple rebalancing triggers are used these will have an order defined by their respective predefined trigger lengths. Generally speaking: a lower order rebalancing trigger will have a shorter predefined trigger length and define a longer balancing process commencement delay; a higher order rebalancing trigger will have a longer predefined trigger length and define a shorter balancing process commencement delay. This allows for a balancing process to be commenced with less delay in the event that congestion occurs faster than expected.

For example, a first rebalancing trigger may have a predefined trigger length of three and define that on activation a balancing process is to be commenced in 5 days. A second rebalancing trigger may have a predefined trigger length of five and define that on activation a balancing process is to be commenced in 12 hours.

As an alternative example, an issue ranking scheme may define a maximum allowed rank length of 253 characters. A first rebalancing trigger may have a predefined trigger length of 100 and define that on activation a balancing process is to be commenced in on the next weekend (i.e. a typically non-working day). A second rebalancing trigger may have a predefined trigger length of 200 and define that on activation a balancing process is to be commenced the next evening (again, selecting a time when system usage is likely to be reduced).

Additional rebalancing triggers could be defined. For example an nth rebalancing trigger could have a predefined trigger length of x and define that a balancing operation is to commence on the next available period of anticipated low ITS activity (e.g. that evening or the next morning). This may be achieved by reference to a system clock and knowledge of what are typically low activity times (e.g. after hours, weekends, public holidays etc.). Alternatively, the delay may be set at 12 hours—the rationale being that a trigger is more likely to fire when the system is most busy and, accordingly, the system is likely to be less busy 12 hours from the trigger.

A final rebalancing trigger may also be defined to activate if an attempt to re-rank an issue fails due to congestion. This trigger may cause rebalancing to commence immediately as well as freeze all user initiated rank operations for a period of time so resources can initially be devoted to the rebalancing.

The systems and methods for triggering a balance process described in this Section may be used to trigger a balancing process as described in Section 3 above. In this case an issue rank scheme defining rank values to have a balancing component and a normal component would be required. The systems and methods of this section may, however, also be used to trigger any alternative balancing process desired. In this case the issue rank scheme need not define rank values to have a balancing component.

Figure 9:
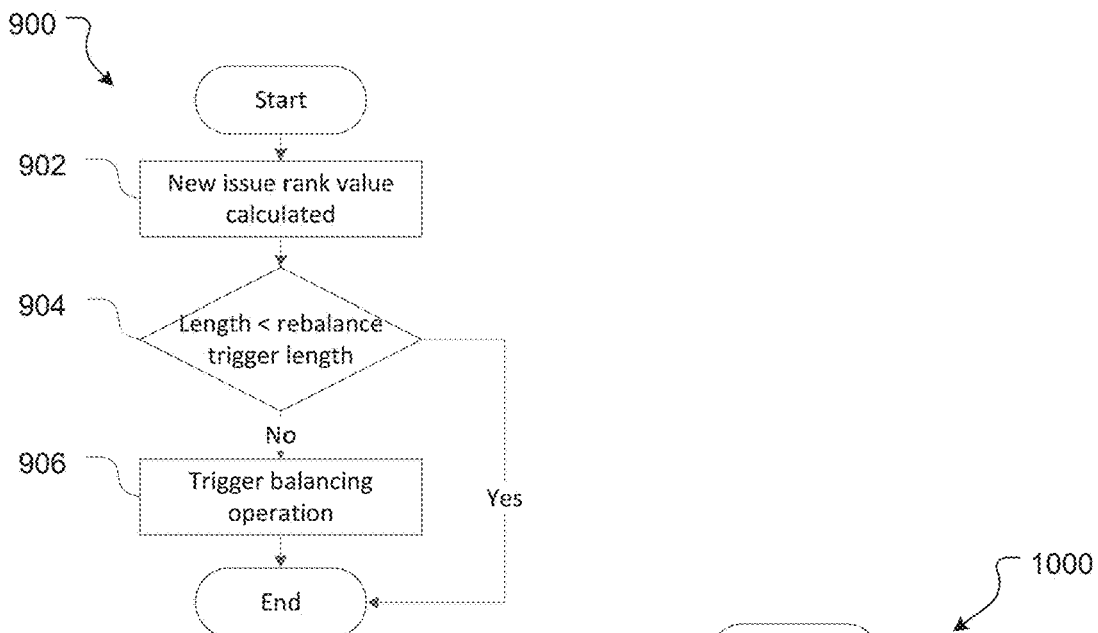
FIG. 9 illustrates a process for triggering a balancing process.

FIG. 9 illustrates a process 900 for triggering a balancing process.

At 902 a new issue rank value is calculated. This may be on creation of an issue, reordering an issue, or balancing an issue. In one embodiment the new issue rank is calculated in accordance with a rank operation processes as described in Section 3 above. Process 900 may be invoked on alternative calculations of new rank values.

At 904 the process determines whether or not the length of the new issue rank value is less than the predefined trigger length.

If the length of the new issue rank value is less than the predefined trigger length, the balance triggering process ends without a rebalancing trigger having being activated.

At 906, if the length of the new issue rank value is greater than or equal to a predefined trigger length, a balance process is triggered. As discussed above, the balance process may be triggered to commence immediately or following a delay.

In embodiments where multiple rebalancing triggers are defined an additional determination is made at (or before) 906. In this case the process determines which of the multiple rebalancing triggers should be activated and, accordingly, how the balance process should be triggered (e.g. so as to commence immediately or with a defined delay). For a given activation, the relevant rebalancing trigger will be the rebalancing trigger that has the longest predefined trigger length that is less than or equal to the length of the new issue rank value.

Figure 10:
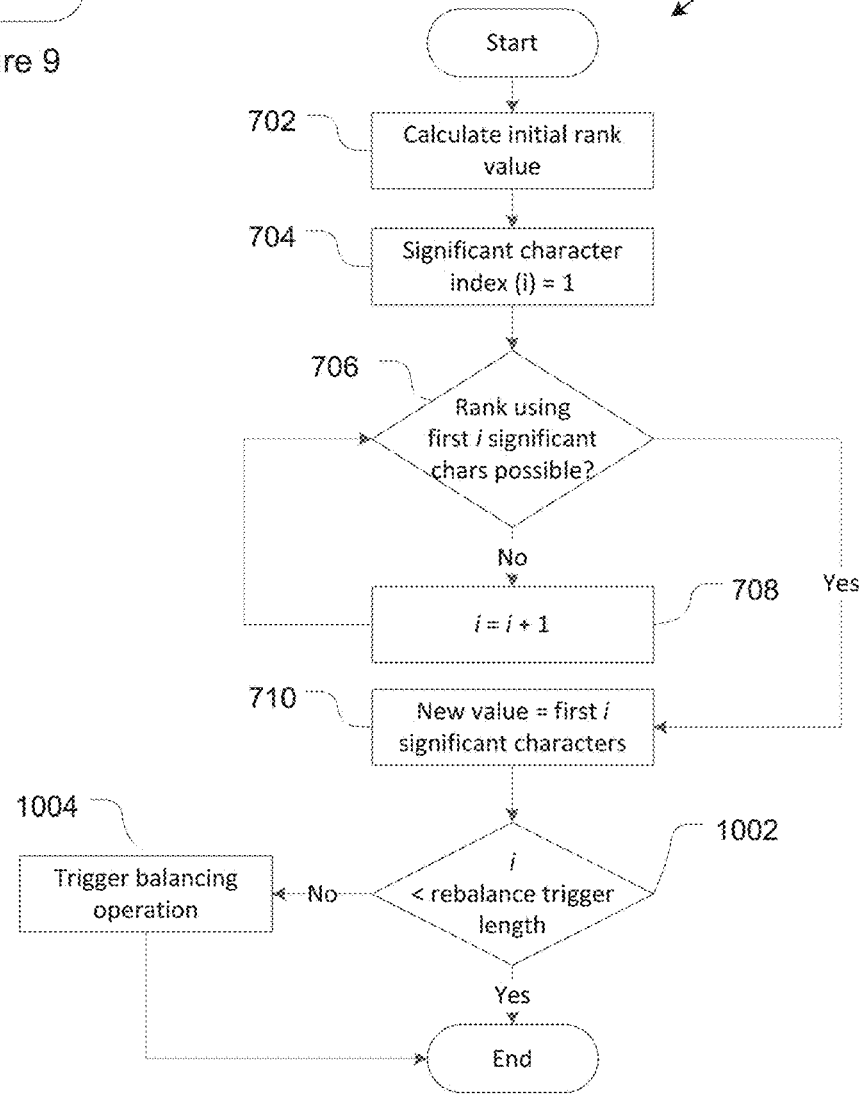
FIG. 10 illustrates a process for calculating new rank values and triggering a balance process.

By way of further example, FIG. 10 illustrates a process 1000 for calculating new rank values and triggering a balance process. Process 1000 is based on process 700 described above and retains the features of process 700 (numbered with the same reference numerals for clarity).

In process 1000, after the new rank value has been determined at 710, the process determines whether or not the length of the new issue rank value is less than the predefined trigger length. This determination can be made with reference to the value of the significant character index i, which represents the length of the new issue rank.

If the length of the new issue rank is less than the predefined trigger length (i<predefined trigger length), the rebalancing trigger is not activated and the process ends.

At 1004, in response to determining that the length of the new issue rank value is greater than or equal to a predefined trigger length (i>=predefined trigger length), a balance process is triggered. As described in the above example, the balance process may be triggered to commence immediately or following a delay.

In embodiments where multiple rebalancing triggers are defined an additional determination is made at (or before) 1004 as to which of the rebalancing triggers is to be activated. The rebalancing trigger to be activated is determined to be the rebalancing trigger with the longest predefined trigger length that is less than or equal to the length of the new issue rank (i.e. that is <=to i).

As can be seen, the rebalance triggering mechanism described above result in balancing processes being automatically triggered. By basing a rebalancing trigger on the length of newly calculated issue ranks, congestion is automatically detected as it occurs. There is no need to run dedicated periodic scans of the ITS to detect congestion. Furthermore, by setting an appropriate predefined trigger length a balancing process can be triggered to commence before congestion gets to the point that rank operations fail. Still further, by using multiple rebalancing triggers attaching to progressively longer issue rank lengths, the possibility of congestion building rapidly is accounted for by allowing the importance of a balancing operation to be elevated (i.e. the delay in commencing a balancing operation decreased).

4.3 Worked Example

In order to further explain the rank operation process described above this section provides a worked example. The context of this worked example is an issue rank scheme defining a maximum allowed rank length of six characters, each character capable of taking the value 0 to 9 or A to Z. This provides for issues with rank values ranging from: "000000" to "ZZZZZZ". In this example the defined rebalancing trigger length is set to three.

For the purposes of this example no balancing component of the rank value is included (or necessary). As will be appreciated from the description of Section 2, however, additional characters of greater significance could be added as a balancing component, or one or more of the most significant characters could be used as a balancing component, without affecting the methodology described in this Section.

In this example, as issues are created/added to the ITS 100 they are assigned initial rank values by performing a rank last operation as described in Section 2 above. As more and more issues are added to the ITS, and/or reordering operations in respect of the issues occur, the new rank values being calculated in the ordering operations will start to have longer rank lengths. For example, Table 20 shows an example of six issues (four real issues, a minimum marker and a maximum marker) stored by an ITS:

TABLE 20

| Issue_ID | Issue_Rank |
| --- | --- |
| 1 | A |
| 2 | AB |
| 3 | AC |
| 4 | B |
| 5 | 000000 |
| 6 | ZZZZZZ |

If a reorder operation is requested to order issue 4 after issue 1 (or before issue 2), the new rank value calculated in the reordering rank operation may be "A6". In this case it is determined (at 904 or 1002) that the new issue rank length (two) is less than the predefined trigger length (three), and the rebalancing trigger is not activated. Table 21 shows the result of such an operation:

TABLE 21

| Issue_ID | Issue_Rank |
| --- | --- |
| 1 | A |
| 2 | AB |
| 3 | AC |
| 4 | A6 |
| 5 | 000000 |
| 6 | ZZZZZZ |

If a reorder operation is the requested to order an issue after issue 2 (or before issue 3), the new rank value calculated in the reordering rank operation will need to have at least three significant characters. For example the new issue rank calculated may be "ABG".

In this case it is determined (at 904 or 1002) that the new issue rank length (three) is greater than or equal to the predefined trigger length (three). Accordingly, the rebalancing trigger is activated (at 906 or 1004) and a balancing process is commenced or scheduled for commencement.

In order to describe various features specific processes with specific operations are described above—e.g. process 600, process 700, process 800, process 900, and process 1000. These processes may be varied. For example: a given functional block may be implemented in an alternative way to achieve the relevant result; a given functional block may be split into multiple functional blocks to achieve the relevant result; one or more functional blocks may be combined into a single functional block to achieve the relevant result; the order in which the functional blocks are performed may (in some cases) be varied.

4.4 Balance Triggering Embodiments

In one embodiment, this disclosure provides systems and methods for triggering a balancing process for balancing issues stored by an ITS. The method comprises calculating a new rank value for an issue; determining whether a length of the new rank value is greater than or equal to a rebalancing trigger length; and in response to the length of the new rank value being greater than or equal to the rebalancing trigger length, triggering an issue balancing process.

The length of a rank value may be the number of characters of the rank value.

Triggering a balancing process may comprise: delaying for a balancing process commencement delay period, the balancing process commencement delay period being associated with the rebalancing trigger length; and following the delay, commencing the issue balancing process.

A plurality of different balancing process commencement delay periods may be defined, each balancing process commencement delay period being associated with a different rebalancing trigger length.

A first rebalancing trigger length may be a shorter rebalancing trigger length and a second rebalancing trigger may be a longer rebalancing trigger length. A first balancing process commencement delay period associated with the first rebalancing trigger may be longer than a second balancing process commencement delay associated with the second balancing trigger.

Once commenced, the balancing operation may be performed according to any of the balancing methods described in Section 3 above.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
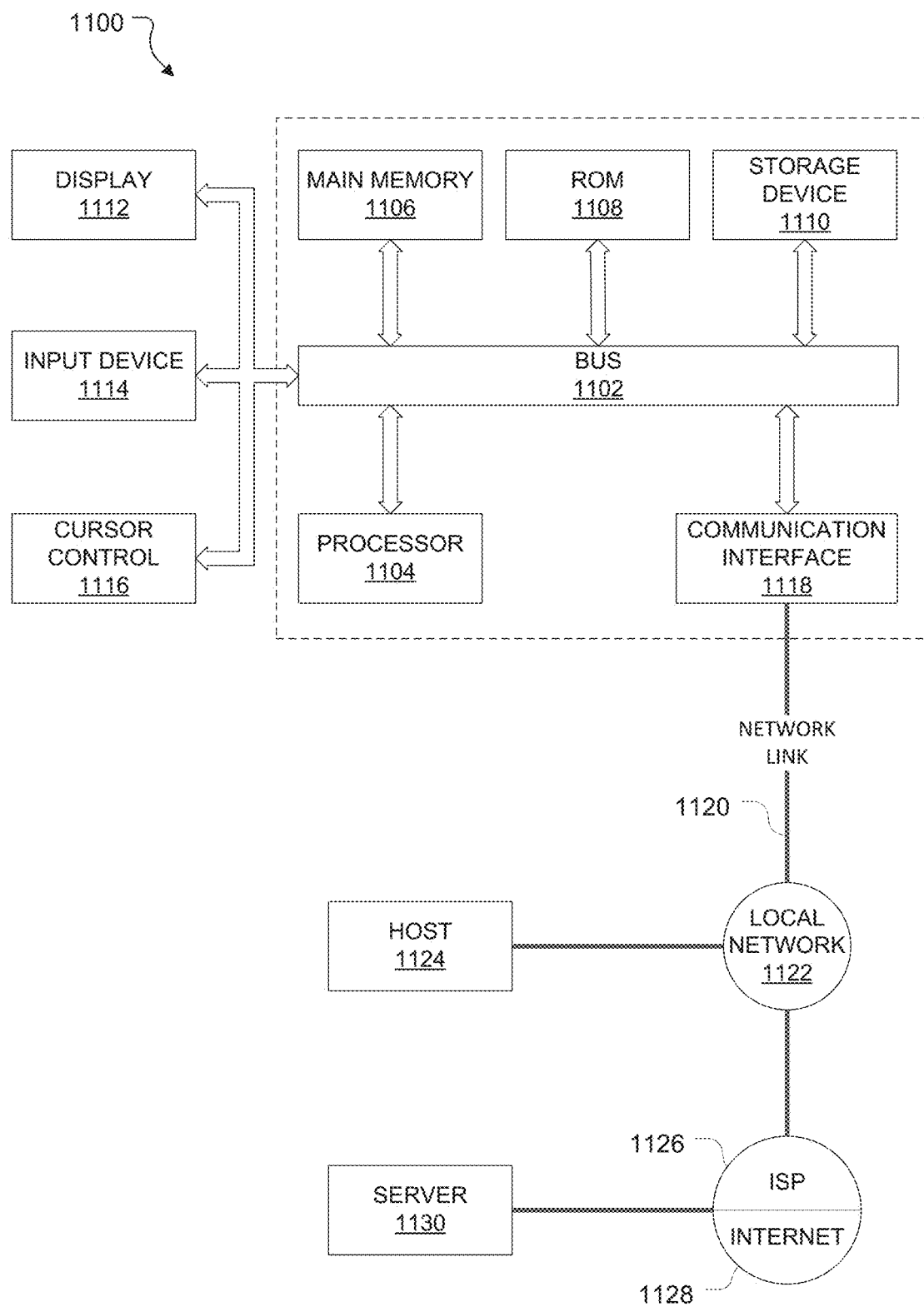
FIG. 11 illustrates a computer system with which various embodiments may be used.

For example, FIG. 11 is a block diagram that illustrates a computer system 1100 upon which an embodiment of the invention may be implemented. Computer system 1100 includes a bus 1102 or other communication mechanism for communicating information, and a hardware processor 104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 102 to one or more output devices such as a display 112 for displaying information to a computer user. Display 112 may, for example, be a cathode ray tube (CRT), a liquid crystal display (LCD), a light emitting diode (LED display), or a touch screen display. An input device 1114, including alphanumeric and other keys, may be coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. Additional and/or alternative input devices are possible, for example touch screen displays.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 106. Such instructions may be read into main memory 106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

A computer system as described herein may be configured in a plurality of useful arrangements. In one approach, a data processing method comprises using a server computer, obtaining from one or more non-transitory computer-readable data storage media a copy of one or more sequences of instructions that are stored on the media and which when executed using a particular user computer among a plurality of user computers cause the particular user computer to perform, using the particular user computer alone or in combination with the server computer, the techniques that are described herein; and using the server computer, downloading the copy of the one or more sequences of instructions to any user computer among the plurality of user computers.

In another approach, a computer system comprises a server computer comprising one or more non-transitory computer-readable data storage media stored with one or more sequences of instructions which when executed using a particular user computer among a plurality of user computers cause the particular user computer to perform: using the particular user computer, alone or in combination with the server computer, the techniques that are described herein; and in the server computer, stored downloading instructions which, when executed using the server computer, cause downloading a plurality of copies of the one or more sequences of instructions to the plurality of user computers.

A computer system may take a variety of forms. For example user computer 112 may be a desktop computer, a laptop computer, a notebook computer, a tablet computer, a smart phone, or other another computer.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer implemented method for maintaining a plurality of database records assigned within a database, each database record having an associated rank value, the rank values of the plurality of database records defining an order of the plurality of database records, the method comprising:

receiving, by a database server computer, a database rank operation request to change the rank of a subject record;

determining, by the database server computer, a set of database records of the plurality of database records applicable to the database rank operation request;

acquiring, by the database server computer using one or more database record lock acquisition requests, a database record lock for locks on each database record of the set of database records;

in response to acquiring the database record lock for each database record of the set of database records:

restricting, by the database server computer, a subsequent database rank operation request for any database record of the set of database records for at least a duration in which the database record lock is acquired;

assigning, by the database server computer, a respective new rank value for each of at least a subset of database records of the set of database records, a particular new rank value of the subject record being assigned in accordance with the received database rank operation request; and saving, by the database server computer, the new rank value for each of the at least the subset of database records of the set of database records.

2. The computer implemented method of claim 1, wherein the database rank operation request is a reorder request, and wherein the set of database records are determined to comprise the subject record, a higher ranked neighbor record, and a lower ranked neighbor record.

3. The computer implemented method of claim 2, wherein the reorder request is selected from a group comprising: a rank first request being a request to rank the subject record as the first record in the rank order; a rank last request being a request to rank the subject record as the last in the rank order; a rank before request being a request to rank the subject record so it is ordered immediately before a specified record; a rank after request being a request to rank the subject record so it is ordered immediately after a specified record.

4. The computer implemented method of claim 1, wherein the new rank value for the subject record is calculated so the new rank value has a length that is less than a maximum rank length.

5. The computer implemented method of claim 1, wherein the database rank operation request is a balance request and wherein the set of database records are determined to comprise the subject record and a neighbor record.

6. The computer implemented method of claim 1, wherein acquiring the database record lock for each database record of the set of database records comprises attempting to write lock data to a lock value field associated with each database record of the set of database records, and wherein successfully written lock data to the lock value field associated with each database record of the set of database records suggests the database record lock is successfully acquired.

7. The computer implemented method of claim 1, further comprising receiving a value in response to the database record lock acquisition request indicating lock data was written to each database record of the set of database records.

8. The computer implemented method of claim 1, further comprising releasing the successfully acquired database record lock for each database record of the set of database records.

9. The computer implemented method of claim 1, further comprising:

in response to failure in acquiring the database record lock for each database record of the set of database records, implementing a delay and, following the delay, re-attempting the database rank operation.

10. The computer implemented method of claim 1, further comprising:

in response to failure in acquiring the database record lock for each database record of the set of database records, unlocking one or more database records that were successfully locked in response to the database record lock acquisition request.

11. One or more non-transitory computer-readable storage media storing one or more sequences of instructions which, when executed using one or more processors, cause performing a computer-implemented method for maintaining a plurality of database records, each database record having an associated rank value, the rank values of the plurality of database records defining an order of the plurality of database records, the instructions causing the one or more processors to:

receive a database rank operation request to change the rank of a subject record of a the plurality of database records;

determine a set of database records of the plurality of database records relevant to the database rank operation request;

acquire, using a single database record lock acquisition request, a database record lock for each database record of the set of database records; and in response to acquiring the database record lock for each database record of the set of database records:

restrict a subsequent database rank operation request for any database record of the set of database records for at least a duration in which the database record lock is acquired;

assign a respective new rank value for each of at least a subset of database records of the set of database records, a particular new rank value of the subject record being assigned in accordance with the received database rank operation request; and save the new rank value for each of the at least the subset of database records of the set of database records.

12. The one or more non-transitory computer-readable storage media of claim 11, wherein the database rank operation request is a reorder request, and wherein the set of database records are determined to comprise the subject record, a higher ranked neighbor record, and a lower ranked neighbor record.

13. The one or more non-transitory computer-readable storage media of claim 12, wherein the reorder request is selected from a group comprising: a rank first request being a request to rank the subject record as the first record in the rank order; a rank last request being a request to rank the subject record as the last record in the rank order; a rank before request being a request to rank the subject record so it is ordered immediately before a specified record; a rank after request being a request to rank the subject record so it is ordered immediately after a specified record.

14. The one or more non-transitory computer-readable storage media of claim 11, wherein the new rank value for_the subject record is calculated so the new rank value has a length that is less than a maximum record rank length.

15. The one or more non-transitory computer-readable storage media of claim 11, wherein the database rank operation request is a balance request and wherein the set of database records are determined to comprise the subject record and a neighbor record.

16. The one or more non-transitory computer-readable storage media of claim 11, wherein acquiring the database record lock for each database record of the set of database records comprises attempting to write lock data to a lock value field associated with each database record of the set of database records, and wherein successfully written local data to the lock value field associated with each database record of the set of database records suggests the database record lock is successfully acquired.

17. The one or more non-transitory computer-readable storage media of claim 11, wherein execution of the sequences of instructions cause the one or more processors to release the successfully acquired database record lock for each database record of the set of database records.

18. The one or more non-transitory computer-readable storage media of claim 11, wherein execution of the sequences of instructions cause the one or more processors to implement a delay and, following the delay, re-attempt the database rank operation in response to failure in acquiring the database record lock for each database record of the set of database records.

19. The one or more non-transitory computer-readable storage media of claim 11, wherein execution of the sequences of instructions cause the one or more processors to unlock one or more database records that were successfully locked in response to the database record lock acquisition request.

* * * * *